(12) United States Patent
Ren et al.

(10) Patent No.: US 12,427,670 B2
(45) Date of Patent: Sep. 30, 2025

(54) COORDINATE SYSTEM CALIBRATION METHOD, AUTOMATIC ASSEMBLY METHOD, AND APPARATUS

(71) Applicant: Honor Device Co., Ltd., Shenzhen (CN)

(72) Inventors: Chao Ren, Shenzhen (CN); Jiangchuang Yu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/036,820

(22) PCT Filed: Sep. 7, 2022

(86) PCT No.: PCT/CN2022/117560
§ 371 (c)(1),
(2) Date: May 12, 2023

(87) PCT Pub. No.: WO2023/061110
PCT Pub. Date: Apr. 20, 2023

(65) Prior Publication Data
US 2024/0017416 A1  Jan. 18, 2024

(30) Foreign Application Priority Data
Oct. 12, 2021 (CN) .......................... 202111185903.8

(51) Int. Cl.
*B25J 9/16* (2006.01)
*B25J 19/02* (2006.01)

(52) U.S. Cl.
CPC .......... *B25J 9/1692* (2013.01); *B25J 9/1687* (2013.01); *B25J 9/1697* (2013.01); *B25J 19/023* (2013.01)

(58) Field of Classification Search
CPC ...... B25J 9/1692; B25J 9/1687; B25J 9/1697; B25J 19/023; B25J 9/1628; B25J 9/163;
(Continued)

(56) References Cited

U.S. PATENT DOCUMENTS 9,457,470 B2   10/2016  Lundberg et al.
11,060,864 B1* 7/2021  Ho ........................... G06T 7/55
(Continued)

FOREIGN PATENT DOCUMENTS

CN   104165584 A   11/2014
CN   105073348 A   11/2015
(Continued)

OTHER PUBLICATIONS

Wu Qiang et al; "Automatic calibration of work coordinates for robotic wire and arc additive re-manufacturing with a single camera"; International Journal of Advanced Manufacturing Technology; Jan. 19, 2021, vol. 114, Issue 9/10, 13 pages.

*Primary Examiner* — Abby Lin
*Assistant Examiner* — Esvinder Singh
(74) *Attorney, Agent, or Firm* — Slater Matsil, LLP

(57) ABSTRACT

This application provides a coordinate system calibration method, an automatic assembly method, and an apparatus. In the coordinate system calibration method, measured values of a measured parameter of a target object are separately measured at two different calibration heights, and then a target calibration height that matches an actual value of the measured parameter is obtained based on the two different calibration heights and the corresponding measured values of the measured parameter. This solution is not only applicable to a planar object but also applicable to a curved object.

20 Claims, 12 Drawing Sheets

(58) Field of Classification Search
CPC ...... B25J 9/1653; B25J 9/1669; B25J 19/021;
G06T 2207/10016; G06T 2207/30108;
G06T 2207/30244; G06T 7/70; G06T
7/80; G06T 7/0004; G06T 7/62; G06T
2207/10004; G06T 7/30; G06T 7/32;
G06T 7/38; G06T 1/0014; G06T 7/97;
B23P 19/00; B23P 19/007; G05B
2219/33263; G05B 2219/37009; G05B
2219/39016; G05B 2219/39057
See application file for complete search history.

(56) References Cited

U.S. PATENT DOCUMENTS

2014/0240520 A1* 8/2014 Liu .................. H04N 23/60
348/187
2016/0114486 A1 4/2016 Huang et al.
2020/0014912 A1 1/2020 Kytsun et al.
2022/0148216 A1* 5/2022 Ohira .................. G01C 15/00

FOREIGN PATENT DOCUMENTS

| | | |
|---|---|---|
| CN | 108240793 A | 7/2018 |
| CN | 109285145 A | 1/2019 |
| CN | 109443129 A | 3/2019 |
| CN | 109454634 A | 3/2019 |
| CN | 109794963 A | 5/2019 |
| CN | 110834333 A | 2/2020 |
| CN | 111791226 A | 10/2020 |
| CN | 112880642 A | 6/2021 |
| CN | 113172636 A | 7/2021 |
| CN | 113643384 A | 11/2021 |
| JP | 2019061502 A | 4/2019 |

* cited by examiner

COORDINATE SYSTEM CALIBRATION METHOD, AUTOMATIC ASSEMBLY METHOD, AND APPARATUS

CROSS-REFERENCE TO RELATED APPLICATIONS

This application is a national stage of International Application No. PCT/CN2022/117560, filed on Sep. 7, 2022, which claims priority to Chinese Patent Application No. 202111185903.8, filed on Oct. 12, 2021, both of which are incorporated herein by references in their entireties.

TECHNICAL FIELD

This application relates to the field of machine vision system technologies, and in particular, to a coordinate system calibration method, an automatic assembly method, and an apparatus.

BACKGROUND

A machine vision system uses a machine instead of a human eye for measurement and determining, converts a shot target into an image signal by using an image shooting apparatus (such as a camera), further processes the image signal to obtain some features of the target, and then controls a device action on the spot based on the features.

A typical application scenario of the machine vision system is that one part is automatically assembled to another part by using an automatic assembly device. In this application scenario, the machine vision system is equivalent to an eye of the automatic assembly device, position coordinates of a target object are obtained by using the machine vision system, and a position of an operation mechanism is controlled based on the position coordinates. However, the position coordinates obtained by the machine vision system are obtained based on a visual coordinate system (or referred to as an image coordinate system), and the operation mechanism moves and grabs an object based on a mechanical motion coordinate system. Therefore, the visual coordinate system needs to be converted into the mechanical motion coordinate system. In a coordinate system conversion process, a position relationship between the visual coordinate system and the mechanical motion coordinate system needs to be calibrated. The calibration process is also referred to as robot hand-eye calibration.

In the foregoing calibration process, if an actual position height of the object is different from a calibration height, a measured value of the object that is obtained by the machine vision system is different from an actual value.

SUMMARY

In view of this, this application provides a coordinate system calibration method, an automatic assembly method, and an apparatus, to resolve at least a part of the foregoing problems. Technical solutions disclosed in this application are as follows.

According to a first aspect, this application provides a coordinate system calibration method, applied to an automatic assembly device. The method includes: obtaining a first measured value corresponding to a measured parameter of a target object at a first calibration height; obtaining a second measured value corresponding to the measured parameter of the target object at a second calibration height; obtaining an actual value corresponding to the measured parameter of the target object; obtaining, based on the first measured value and the second measured value that are corresponding to the measured parameter, the first calibration height, and the second calibration height, a target calibration height that matches the actual value of the measured parameter; and obtaining a mapping relationship between a visual coordinate system corresponding to the target calibration height and a mechanical motion coordinate system.

In this implementation, measured values of the measured parameter that are corresponding to the target object at two different calibration heights are separately obtained, to obtain the target calibration height that makes the measured value of the measured parameter equal to the actual value. Further, only the mapping relationship between the visual coordinate system corresponding to the target calibration height and the mechanical motion coordinate system needs to be obtained. It can be learned that this solution is not only applicable to a planar object but also applicable to a curved object, and an application range is extended.

In a possible implementation of the first aspect, the obtaining, based on the first measured value and the second measured value that are corresponding to the measured parameter, the first calibration height, and the second calibration height, a target calibration height that matches the actual value of the measured parameter includes: calculating a first measured difference between the first measured value and the second measured value of the measured parameter, and calculating a first height difference between the first calibration height and the second calibration height; calculating a ratio of the first measured difference to the first height difference; and obtaining, through calculation based on algebraic expressions that have equal ratios and that are corresponding to the two calibration heights, the target calibration height that matches the actual value of the measured parameter.

In this implementation, the target height that matches the actual value of the measured parameter is calculated based on two different calibration heights and measured values of the measured parameter that are measured at the two calibration heights. In this solution, there is no need to adjust a calibration height a plurality of times to find the target calibration height that makes the measured value equal to the actual value. Therefore, complexity of a calibration process is reduced, and calibration efficiency is improved.

In another possible implementation of the first aspect, the obtaining, based on the first measured value and the second measured value that are corresponding to the measured parameter, the first calibration height, and the second calibration height, a target calibration height that matches the actual value of the measured parameter includes:

obtaining the target calibration height through calculation according to the following formula:

$$z3 = \frac{(z2-z1)(L3-L1)}{L2-L1} + z1$$

Herein, z3 is the target calibration height, z2 is the second calibration height, z1 is the first calibration height, L3 is the actual value of the measured parameter, L2 is the second measured value of the measured parameter, and L1 is the first measured value of the measured parameter.

In another possible implementation of the first aspect, the obtaining a mapping relationship between a visual coordinate system corresponding to the target calibration height and a mechanical motion coordinate system includes: obtaining a visual coordinate position corresponding to an identification point on a calibration board at the target calibration height; obtaining a mechanical coordinate position corresponding to the identification point; and determining, based on the visual coordinate position and the mechanical coordinate position that are corresponding to the identification point, the mapping relationship between the visual coordinate system corresponding to the target calibration height and the mechanical motion coordinate system.

In another possible implementation of the first aspect, the obtaining a first measured value corresponding to a measured parameter of a target object at a first calibration height includes: obtaining a visual measured value that is of the measured parameter in the visual coordinate system and that is corresponding to the target object at the first calibration height; and converting the visual measured value into a measured value corresponding to the mechanical motion coordinate system based on a first mapping relationship between a visual coordinate system corresponding to the first calibration height and the mechanical motion coordinate system, to obtain the first measured value.

In another possible implementation of the first aspect, the target object is a mobile phone curved screen, and the measured parameter includes a short-side length of the mobile phone curved screen.

In another possible implementation of the first aspect, the measured parameter further includes a long-side length of the mobile phone curved screen.

In another possible implementation of the first aspect, the target object is a mobile phone middle frame, and the measured parameter includes an identification point relative distance on the mobile phone middle frame.

According to a second aspect, this application further provides an automatic assembly method, used to assemble a mobile phone screen and a mobile phone middle frame. The method includes: placing the mobile phone screen at a short-side target calibration height, and obtaining a short-side length value of the mobile phone screen based on a coordinate system mapping relationship corresponding to the short-side target calibration height; placing the mobile phone screen at a long-side target calibration height, and obtaining a long-side length value of the mobile phone screen based on a coordinate system mapping relationship corresponding to the long-side target calibration height; placing the mobile phone middle frame at a middle-frame target calibration height, and obtaining a long-side length value and a short-side length value of the mobile phone middle frame based on a coordinate system mapping relationship corresponding to the middle-frame target calibration height; determining a target assembly gap value based on the long-side length value and the short-side length value of the mobile phone screen and the long-side length value and the short-side length value of the mobile phone middle frame; and adjusting a relative position of the mobile phone screen and the mobile phone middle frame, so that an actual gap value of the mobile phone screen and the mobile phone middle frame matches the target assembly gap value. The short-side target calibration height, the long-side target calibration height, the middle-frame target calibration height, and a coordinate system mapping relationship corresponding to each calibration height are obtained by using the coordinate system calibration method according to any one of the possible implementations of the first aspect.

According to the automatic assembly method provided in this implementation, long-side lengths and short-side lengths of the mobile phone screen and the mobile phone middle frame are measured by using calibration results of the mobile phone screen and the mobile phone middle frame, and a target assembly gap between the mobile phone screen and the mobile phone middle frame is further obtained through calculation. Finally, four gaps existing after the mobile phone screen and the mobile phone middle frame are assembled are evenly distributed, and an error of the assembly gap is reduced.

In a possible implementation of the second aspect, the determining a target assembly gap value based on the long-side length value and the short-side length value of the mobile phone screen and the long-side length value and the short-side length value of the mobile phone middle frame includes: calculating a difference between the long-side length value of the mobile phone screen and the long-side length value of the mobile phone middle frame, to obtain a long-side difference; calculating a difference between the short-side length value of the mobile phone screen and the short-side length value of the mobile phone middle frame, to obtain a short-side difference; and calculating a quarter value of the long-side difference and the short-side difference, to obtain the target assembly gap value.

In this implementation, accurate values of the long-side length and the short-side length of the mobile phone screen and accurate values of the long-side length and the short-side length of the mobile phone middle frame can be obtained. Further, an even gap, that is, the target assembly gap value, between four sides of the mobile phone screen and four sides of the mobile phone middle frame is obtained through calculation based on the four values. This improves accuracy of the target assembly gap value.

According to a third aspect, this application further provides an automatic assembly device. The automatic assembly device includes a clamping mechanism, one or more cameras, one or more processors, and a memory. The memory is configured to store program code. The clamping mechanism is configured to clamp a target object, and place the target object at a preset calibration height in response to a first motion control instruction, where the first motion control instruction is generated by the processor. The camera obtains an image corresponding to the target object at the preset calibration height in response to a first photographing instruction, where the first photographing instruction is generated by the processor. The processor is configured to run the program code to perform the following steps:

obtaining an image corresponding to the target object at a first calibration height, and obtaining a first measured value corresponding to a measured parameter; obtaining an image corresponding to the target object at a second calibration height, and obtaining a second measured value corresponding to the measured parameter; obtaining an actual value corresponding to the measured parameter of the target object; obtaining, based on the first measured value and the second measured value that are corresponding to the measured parameter, the first calibration height, and the second calibration height, a target calibration height that matches the actual value of the measured parameter; and obtaining a mapping relationship between a visual coordinate system corresponding to the target calibration height and a mechanical motion coordinate system.

In a possible implementation of the third aspect, when obtaining, based on the first measured value and the second measured value that are corresponding to the measured parameter, the first calibration height, and the second calibration height, the target calibration height that matches the actual value of the measured parameter, the processor is specifically configured to: calculate a first measured difference between the first measured value and the second measured value of the measured parameter, and calculate a first height difference between the first calibration height and the second calibration height; calculate a ratio of the first measured difference to the first height difference; and obtain, through calculation based on algebraic expressions that have equal ratios and that are corresponding to the two calibration heights, the target calibration height that matches the actual value of the measured parameter.

In another possible implementation of the third aspect, when obtaining, based on the first measured value and the second measured value that are corresponding to the measured parameter, the first calibration height, and the second calibration height, the target calibration height that matches the actual value of the measured parameter, the processor is specifically configured to:

obtain the target calibration height through calculation according to the following formula:

$$z3 = \frac{(z2-z1)(L3-L1)}{L2-L1} + z1$$

Herein, z3 is the target calibration height, z2 is the second calibration height, z1 is the first calibration height, L3 is the actual value of the measured parameter, L2 is the second measured value of the measured parameter, and L1 is the first measured value of the measured parameter.

In another possible implementation of the third aspect, the obtaining a mapping relationship between a visual coordinate system corresponding to the target calibration height and a mechanical motion coordinate system includes: obtaining a visual coordinate position corresponding to an identification point on a calibration board at the target calibration height; obtaining a mechanical coordinate position corresponding to the identification point; and determining, based on the visual coordinate position and the mechanical coordinate position that are corresponding to the identification point, the mapping relationship between the visual coordinate system corresponding to the target calibration height and the mechanical motion coordinate system.

In another possible implementation of the third aspect, the obtaining a first measured value corresponding to a measured parameter of a target object at a first calibration height includes: obtaining a visual measured value that is of the measured parameter in the visual coordinate system and that is corresponding to the target object at the first calibration height; and converting the visual measured value into a measured value corresponding to the mechanical motion coordinate system based on a first mapping relationship between a visual coordinate system corresponding to the first calibration height and the mechanical motion coordinate system, to obtain the first measured value.

In another possible implementation of the third aspect, the target object is a mobile phone curved screen, and the measured parameter includes a short-side length and a long-side length of the mobile phone curved screen; or the target object is a mobile phone middle frame, and the measured parameter includes an identification point relative distance on the mobile phone middle frame.

In another possible implementation of the third aspect, the clamping mechanism includes an operation mechanism and a support platform; the operation mechanism separately places a mobile phone screen at a short-side target calibration height corresponding to a short-side length and a long-side target calibration height corresponding to a long-side length in response to a second motion control instruction; the camera separately obtains images corresponding to the mobile phone screen at the short-side target calibration height and the long-side target calibration height in response to a second photographing instruction; the support platform places a mobile phone middle frame at a middle-frame target calibration height in response to a third motion control instruction; the camera obtains an image corresponding to the mobile phone middle frame at the middle-frame target calibration height in response to a third photographing instruction; and the processor runs the program code stored in the memory, to further perform the following steps:

obtaining a short-side length value of the mobile phone screen based on the image corresponding to the mobile phone screen at the short-side target calibration height and a coordinate system mapping relationship corresponding to the short-side target calibration height; obtaining a long-side length value of the mobile phone screen based on the image corresponding to the mobile phone screen at the long-side target calibration height and a coordinate system mapping relationship corresponding to the long-side target calibration height; obtaining a long-side length value and a short-side length value of the mobile phone middle frame based on the image corresponding to the mobile phone middle frame at the middle-frame target calibration height and a coordinate system mapping relationship corresponding to the middle-frame target calibration height; determining a target assembly gap value based on the long-side length value and the short-side length value of the mobile phone screen and the long-side length value and the short-side length value of the mobile phone middle frame; and controlling the operation mechanism to adjust a position of the mobile phone screen, so that an actual gap value of the mobile phone screen and the mobile phone middle frame matches the target assembly gap value.

In another possible implementation of the third aspect, the determining a target assembly gap value based on the long-side length value and the short-side length value of the mobile phone screen and the long-side length value and the short-side length value of the mobile phone middle frame includes: calculating a difference between the long-side length value of the mobile phone screen and the long-side length value of the mobile phone middle frame, to obtain a long-side difference; calculating a difference between the short-side length value of the mobile phone screen and the short-side length value of the mobile phone middle frame, to obtain a short-side difference; and calculating a quarter value of the long-side difference and the short-side difference, to obtain the target assembly gap value.

According to a fourth aspect, this application further provides a computer-readable storage medium. The computer-readable storage medium includes instructions, and when the instructions are run on an automatic assembly device, the device is enabled to perform the coordinate system calibration method according to any one of the first aspect or the possible implementations of the first aspect.

According to a fifth aspect, this application further provides another computer-readable storage medium. The computer-readable storage medium includes instructions, and when the instructions are run on an automatic assembly device, the device is enabled to perform the automatic assembly method according to any one of the second aspect or the possible implementations of the second aspect.

According to a sixth aspect, this application provides a computer program product including instructions. When the computer program product runs on an automatic assembly device, the device is enabled to perform the coordinate system calibration method according to any one of the first aspect or the possible implementations of the first aspect.

According to a seventh aspect, this application provides a computer program product including instructions. When the computer program product runs on an automatic assembly device, the device is enabled to perform the automatic assembly method according to any one of the second aspect or the possible implementations of the second aspect.

It should be understood that descriptions of technical features, technical solutions, beneficial effects, or similar expressions in this application are not intended to imply that all features and advantages can be implemented in any single embodiment. On the contrary, it may be understood that descriptions of features or beneficial effects mean that specific technical features, technical solutions or beneficial effects are included in at least one embodiment. Therefore, descriptions of technical features, technical solutions, or beneficial effects in this specification do not necessarily refer to a same embodiment. Further, the technical features, technical solutions, and beneficial effects described in the embodiments may be combined in any appropriate manner. A person skilled in the art should understand that an embodiment may be implemented without one or more specific technical features, technical solutions, or beneficial effects in a specific embodiment. In other embodiments, additional technical features and beneficial effects may be identified in a specific embodiment that does not reflect all embodiments.

BRIEF DESCRIPTION OF THE DRAWINGS

To describe the technical solutions in embodiments of the present invention or the conventional technology more clearly, the following briefly describes the accompanying drawings for describing the embodiments or the conventional technology. It is clear that, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
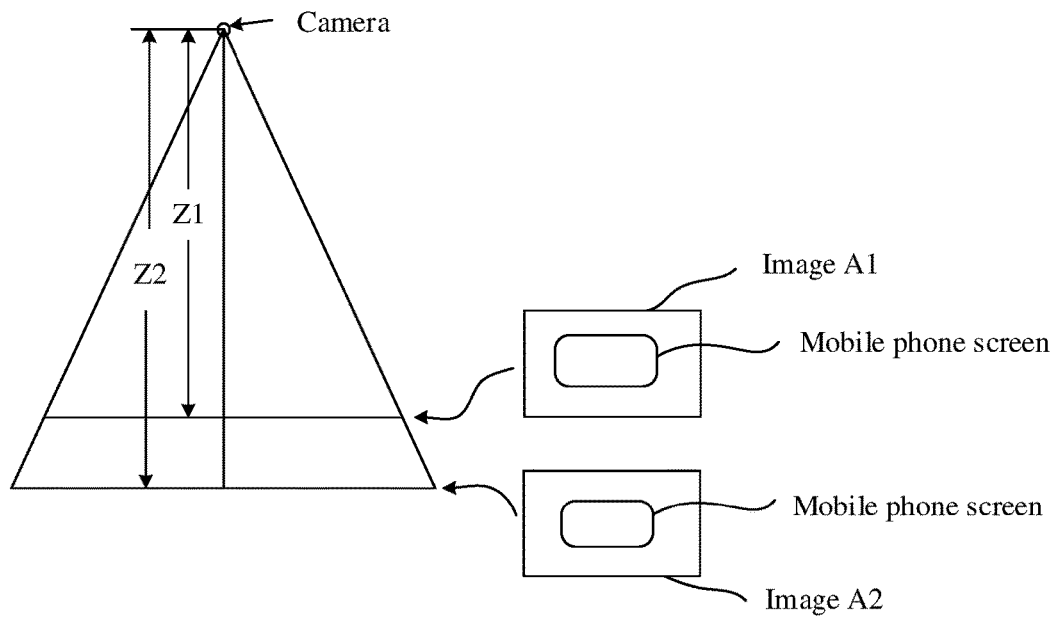
FIG. 1 is a schematic diagram of images obtained when an object is at different z-direction heights according to an embodiment of this application.

The terms "first", "second", "third", and the like in the specification, claims, and accompanying drawings of this application are used to distinguish between different objects, but are not used to limit a specific sequence.

In embodiments of this application, words such as "example" or "for example" are used to represent giving examples, illustrations, or descriptions. Any embodiment or design solution described as "example" or "for example" in embodiments of this application should not be construed as being more preferred or advantageous than other embodiments or design solutions. Specifically, the words such as "example" or "for example" are used to present related concepts in a specific manner.

For clarity and brevity of the following embodiments, terms in this application are first explained.

Coordinate system calibration is calibration of a conversion relationship between two coordinate systems: a visual coordinate system and a mechanical motion coordinate system. Coordinate system calibration helps a robot convert obtained visual information, to complete subsequent control work, such as visual grab.

A calibration height is a height in a z-axis direction in a visual coordinate system.

In an existing coordinate system calibration solution, a calibration board is used to replace an actual object, such as a mobile phone screen or a mobile phone middle frame, and a mapping relationship between position coordinates of an identification point in an image on the calibration board and position coordinates of the identification point in a mechanical motion coordinate system, that is, a mapping relationship between a visual coordinate system and a mechanical motion coordinate system, is determined. In this calibration manner, there is no difference in a scenario in which a target object is planar. However, in a scenario in which a target object is curved, for example, a scenario in which a mobile phone screen is a curved screen, a measured value of the target object measured on a calibration plane deviates from an actual value. The inventor further finds that a reason for this problem is as follows:

An example in which a target object is a curved mobile phone screen is used for description. Because the entire mobile phone screen is not planar and includes a curved part, a position that requires special precision control is selected as a calibration plane of the mobile phone screen. For example, a plane on which a micro-gap is located, that is, a plane with a largest area on the mobile phone screen, is selected as the calibration plane because a micro-gap design is used at a position at which the mobile phone screen cooperates with a handset, that is, a size at a position of the handset needs to be specially controlled.

When the curved screen is calibrated, an image of the plane on which the calibration plane is located is shot by using a camera, and then a mapping relationship between position coordinates in the image and position coordinates of the curved screen in a mechanical motion coordinate system, that is, a mapping relationship between a visual coordinate system and a mechanical motion coordinate system, is determined.

The curved screen has a specific radian in a width direction of the curved screen. To be specific, the calibration plane is not on a same plane as a long frame of the mobile phone screen, that is, z-direction height positions of the calibration plane and the long frame of the mobile phone screen are different.

The z-direction height is a height in a z-axis direction in a visual coordinate system, and usually refers to a vertical distance between the camera and the calibration plane of the target object. That is, a larger distance between the calibration plane of the target object and the camera leads to a larger z-direction height. On the contrary, a smaller distance between the calibration plane of the target object and the camera leads to a smaller z-direction height.

A size of a shot image of the calibration plane varies with the distance between the camera and the calibration plane. For example, as shown in FIG. 1, positions of the mobile phone screen in the x-axis direction and the y-axis direction are not changed, and only a position of the mobile phone screen in the z-axis direction is changed. For example, an image A1 is obtained by shooting the mobile phone screen at a height $z1$, an image A2 is obtained by shooting the mobile phone screen at a height $z2$, and $z1<z2$.

A size of a photographing range corresponding to the height $z1$ is less than a size of a photographing range corresponding to the height $z2$. Herein, a size is measured in a length measurement unit, such as mm or cm. However, a total quantity of pixels of the image A1 is the same as that of the image A2. Therefore, a quantity of pixels included in a unit are in the photographing range corresponding to the height $z1$ is greater than a quantity of pixels included in a unit area in the photographing range corresponding to the height $z2$, that is, a smaller z-direction height of a same object corresponds to a larger quantity of pixels.

For a curved screen, a z-direction height position $z1$ of a planar part is less than a z-direction height position $z2$ of a curved part, that is, the curved part is farther from the camera. However, an actual z-direction height of the curved part is greater than the z-direction height of the planar part. Therefore, a quantity of pixels included in the curved part that is obtained at the height $z2$ is less than a quantity of pixels obtained when the curved part is actually located at the height $z1$, that is, the quantity of pixels included in the curved part is smaller.

A measured width value of the curved screen is obtained through calculation by using an image of the entire curved screen that is shot when the planar part (that is, the calibration plane) is at a calibration height and a visual-mechanical conversion relationship corresponding to the calibration height. However, in this case, a quantity of pixels in the curved part in the image is smaller, and therefore, the measured width value of the curved screen is less than an actual width value. To achieve consistency between the measured width value and the actual width value, a corresponding calibration height that maintains the consistency between the measured width value and the actual width value needs to be searched for through a plurality of times of repeated calibration, that is, a calibration height at which the curved screen is located needs to be adjusted a plurality of times, and a measured width value corresponding to each calibration height needs to be obtained. The repeated calibration process is not stopped until the measured width value is consistent with the actual width value. In this manner, repeated calibration needs to be performed a plurality of times, and the calibration process is cumbersome and inefficient.

To resolve the foregoing technical problem, this application provides a coordinate system calibration method. On the premise that an actual value $L3$ of a measured parameter of a target object can be obtained, measured values of the measured parameter are obtained when the target object is separately at two different calibration heights. For example, when the target object is at a first calibration height $z1$, a measured length value of the target object is obtained and is denoted as $L1$, and when the target object is at a second calibration height $z2$, a measured length value of the target object is obtained and is denoted as $L2$. A target calibration height $z3$ corresponding to an actual length value is obtained through calculation based on a trigonometric function relationship by using $z1$, $L1$, $z2$, $L2$, and $L3$. Then, a calibration board is placed at a position of the target calibration height $z3$ for calibration, to obtain a mapping relationship between a visual coordinate system corresponding to the target calibration height and a mechanical motion coordinate system.

In this solution, the measured values of the measured parameter of the target object are separately measured at two different calibration heights, and then the target calibration height that matches the actual value of the measured parameter is obtained through calculation based on the two different calibration heights and the corresponding measured values of the measured parameter. An accurate mapping relationship between the visual coordinate system and the mechanical motion coordinate system can be obtained by performing calibration only once at the target calibration height. A measured value that is corresponding to the measured parameter of the target object and that is obtained at the target calibration height is consistent with the actual value, that is, accuracy of a coordinate system calibration result is improved. Regardless of whether the target object is a planar object or a curved object, a coordinate system calibration result that is consistent with the actual value of the measured parameter of the target object can be obtained by using the solution. This extends an application range of the solution.

In addition, in the solution, a calibration height does not need to be adjusted a plurality of times to search for a calibration height that is consistent with the actual value of the measured parameter. Based on two arbitrary calibration heights and measured values of the measured parameter that are corresponding to the two arbitrary calibration heights, the target calibration height that matches the actual value of the measured parameter is directly obtained through calculation, and coordinate system calibration is directly performed once at the target calibration height. Therefore, the solution reduces complexity of a coordinate system calibration process, and improves coordinate system calibration efficiency.

For clarity and brevity of the following embodiments, an example of automatically assembling a mobile phone screen and a mobile phone middle frame is used to describe a working process of an automatic assembly device.

Figure 2:
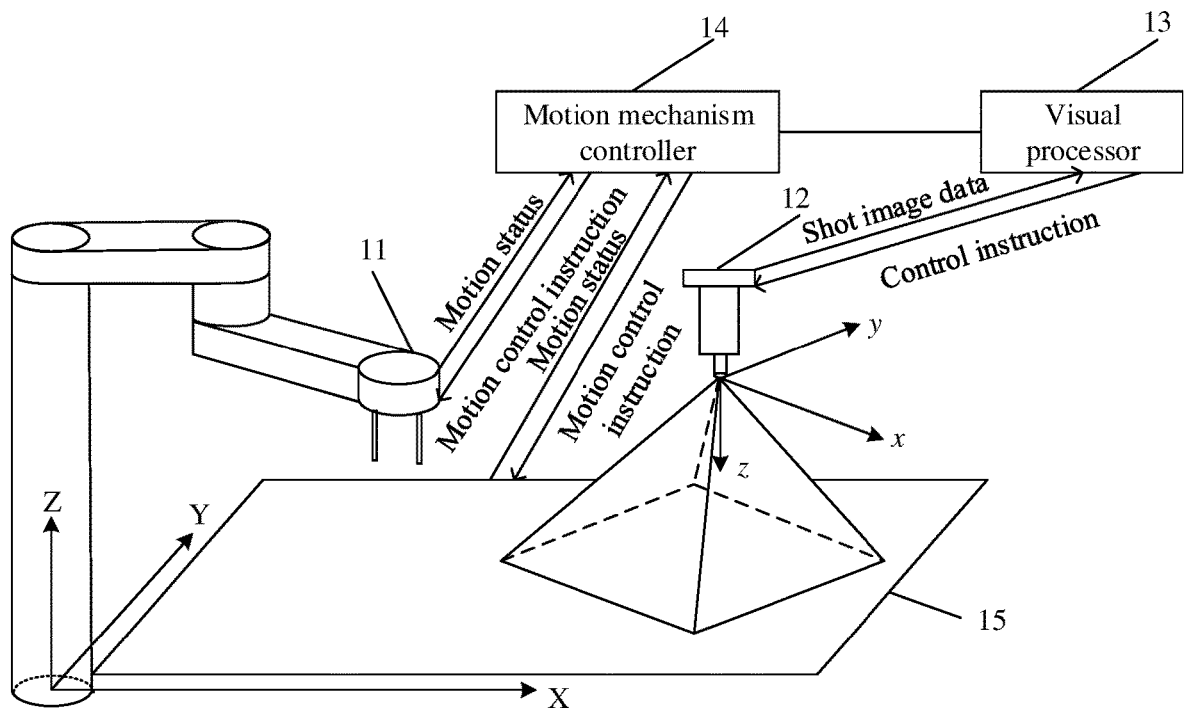
FIG. 2 is a schematic diagram of a structure principle of an automatic assembly device according to an embodiment of this application.

FIG. 2 is a schematic diagram of a structure principle of an automatic assembly device according to an embodiment of this application. As shown in FIG. 2, the automatic assembly device includes an operation mechanism 11, one or more cameras 12, a visual processor 13, a motion mechanism controller 14, and a support platform 15.

It may be understood that the structure of the automatic assembly device shown in this embodiment does not constitute a specific limitation on the device. In some other embodiments, the automatic assembly device may include more or fewer components than those shown in the figure, or combine some components, or split some components, or have different component arrangements. The components shown in the figure may be implemented by hardware, software, or a combination of software and hardware.

The operation mechanism 11 (or referred to as a manipulator) is configured to grab and move a to-be-assembled part, such as a mobile phone screen or a mobile phone middle frame. The support platform 15 is configured to support another to-be-assembled part.

In an example embodiment, a positioning base for fastening a to-be-assembled part is disposed on the support platform 15, and the support platform 15 can move in a translational manner or a lift manner, so that the positioning base implements movement in a horizontal direction and a vertical direction. Further, a part fastened on the positioning base moves with the positioning base.

For example, if a part A needs to be assembled to a part B, the part B may be fastened on the support platform 15, the part A is clamped by using the operation mechanism 11, and further the part A is assembled to the part B by moving the operation mechanism 11 and/or the support platform 15.

The camera 12 (or referred to as a video camera) is configured to shoot an image of a to-be-assembled part to obtain a position of the to-be-assembled part.

An image sensor is an important part of a camera. According to different types of components that constitute image sensors, the image sensors may be classified into two types: a charge coupled device (Charge coupled Device, CCD) and a complementary-metal-oxide semiconductor (Complementary-Metal-Oxide Semiconductor, CMOS). A camera including a CCD component is referred to as a CCD camera, and a camera including a CMOS component is referred to as a CMOS camera. The camera 12 may be either of the CCD camera and the CMOS camera.

Both the camera 12 and the motion mechanism controller 14 are connected to the visual processor 13 by using a communications bus.

The camera 12 may receive a photographing instruction (that is, a first photographing instruction) sent by the visual processor 13. In addition, the camera 12 may send a shot image to the visual processor 13, so that the visual processor 13 performs a further operation based on the image.

The visual processor 13 may obtain position coordinates of a target object based on the image shot by the camera 12, further generate, based on the position coordinates, a motion control instruction (that is, a first motion control instruction) for controlling the operation mechanism 11 or the support platform 15, and send the motion control instruction to the motion mechanism controller 14. The motion mechanism controller 14 controls an action of the operation mechanism 11 or the support platform 15 based on the motion control instruction, for example, controls the operation mechanism 11 to grab an object or move, or controls the support platform 15 to move in a translational manner or a lift manner.

The position coordinates obtained by the camera 12 are based on a visual coordinate system, that is, an xyz coordinate system in FIG. 2. A motion mechanism (the operation mechanism and the support platform) is based on a mechanical motion coordinate system, that is, an XYZ coordinate system in FIG. 2. Origins, positive directions, and unit lengths of the two coordinate systems are different. Therefore, a position relationship between the visual coordinate system and the mechanical motion coordinate system needs to be calibrated. The calibration process may be implemented by the visual processor 13 by executing a corresponding calibration program.

The visual processor 13 may include one or more processing units. For example, the visual processor 13 may include a calibration processor, a motion control processor, and the like. The calibration processor is mainly configured to run a calibration program to implement mapping from the visual coordinate system to the mechanical motion coordinate system. The motion control processor is mainly configured to control an operation of each motion mechanism, such as the operation mechanism 11 or the support platform 15.

In an embodiment of this application, functions of the visual processor 13 and the motion mechanism controller 14 may be integrated into a same processor. This is not limited in this application.

Figure 3:
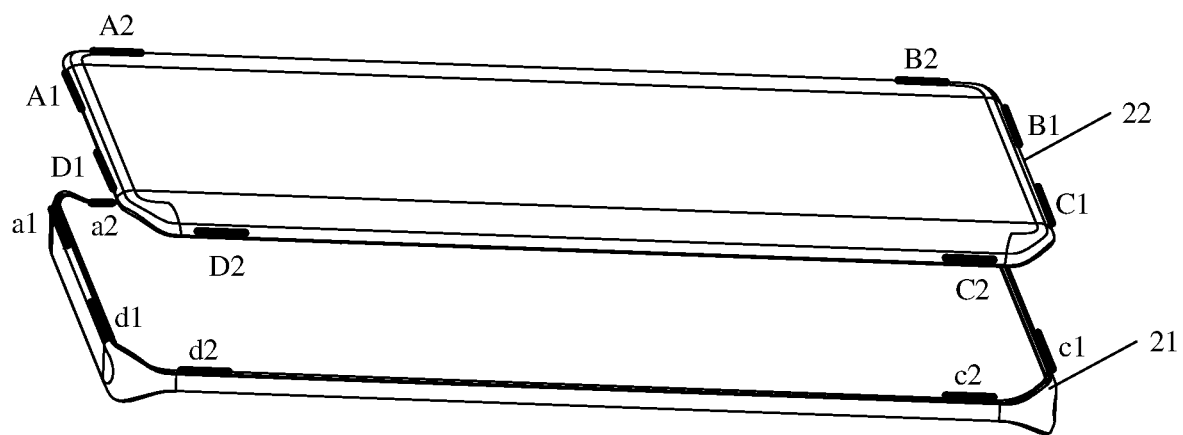
FIG. 3 is a schematic diagram of a relative position of a mobile phone screen and a mobile phone middle frame before assembly according to an embodiment of this application.

When a mobile phone screen and a mobile phone middle frame are assembled by using the automatic assembly device, as shown in FIG. 3, z-direction heights of the mobile phone middle frame 21 and the mobile phone screen 22 are different, and then the mobile phone screen 22 and the mobile phone middle frame 21 are separately photographed by using the camera to recognize a relative position thereof.

Figure 4:
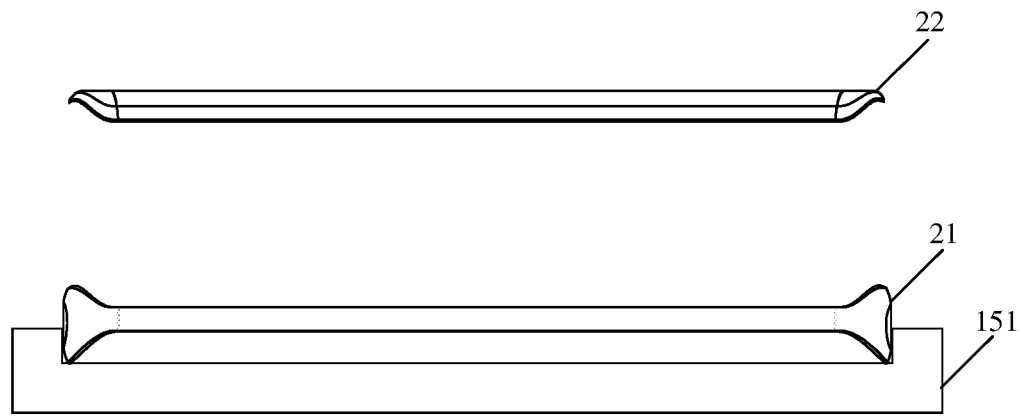
FIG. 4 is a schematic diagram of a fitting side of a mobile phone screen according to an embodiment of this application.

As shown in FIG. 4, the mobile phone middle frame 21 is fastened on a positioning base 151, and the mobile phone screen 22 is grabbed by using the operation mechanism and is moved to a place above the mobile phone middle frame 21. The camera is used to photograph fitting sides of the mobile phone screen 22 and the mobile phone middle frame 21 to recognize a relative position thereof, and a position of the mobile phone screen 22 is adjusted based on the relative position, so that the fitting sides of the mobile phone screen 22 and the mobile phone middle frame 21 are aligned. Four-side alignment herein means that an error between a fitting side of the mobile phone screen and a fitting side at a corresponding position on the mobile phone middle frame is within a preset range.

Figure 5:
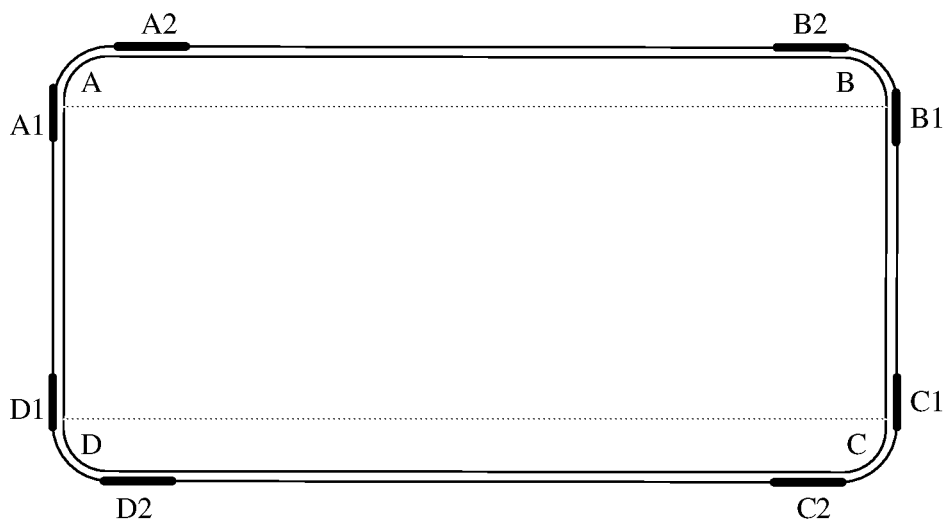
FIG. 5 is a schematic diagram of a relative position of fitting sides of a mobile phone screen and a mobile phone middle frame according to an embodiment of this application.

For example, the fitting sides of the mobile phone middle frame 21 and the mobile phone screen 22 are sides at relative positions in four corners. As shown in FIG. 5, the mobile phone screen 22 includes four corners: A, B, C, and D, and two sides of the four corners are A1 and A2; B1 and B2; C1 and C2; and D1 and D2. In this case, four groups of fitting sides of the mobile phone screen 22 are A1 and B2; B1 and A2; C1 and D2; and D1 and C2.

Similarly, four groups of fitting sides of the mobile phone middle frame 21 correspond to positions of the fitting sides of the mobile phone screen 22.

In an automatic assembly process, a group of fitting sides of the mobile phone screen 22 needs to be aligned with fitting sides at a same position on the mobile phone middle frame 21. For example, as shown in FIG. 3, the side A1 of the mobile phone screen is aligned with a side a1 of the mobile phone middle frame, the side B2 of the mobile phone screen is aligned with a side at a same position on the mobile phone middle frame, the side A2 is aligned with a side a2, and the side B1 of the mobile phone screen is aligned with a side at a same position on the mobile phone middle frame. Similarly, the side C1 may be aligned with a side c1, the side D2 may be aligned with a side d2, the side D1 may be aligned with a side d1, and the side C2 may be aligned with a side c2. In actual use, at least one group of fitting sides may be selected for alignment, to implement alignment matching between the mobile phone screen and the mobile phone middle frame. In a process of aligning the mobile phone screen and the mobile phone middle frame, a machine vision system photographs fitting sides of the mobile phone screen 22 and the mobile phone middle frame 21, to determine whether the fitting sides of the mobile phone screen 22 and the mobile phone middle frame 21 are aligned and matched.

Figure 6:
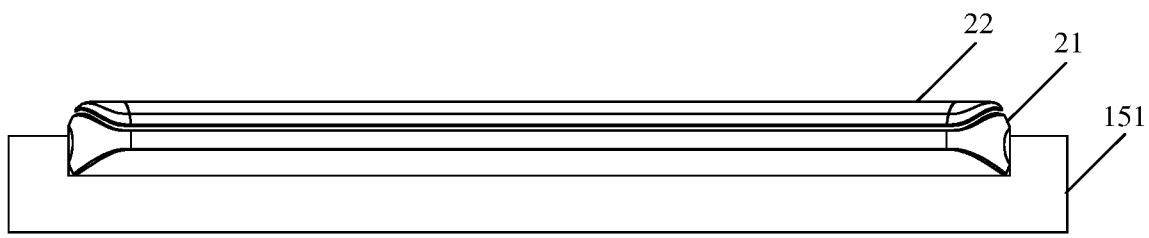
FIG. 6 is a schematic diagram of a mobile phone screen and a mobile phone middle frame after assembly according to an embodiment of this application.

After it is determined that the fitting sides of the mobile phone screen 22 and the mobile phone middle frame 21 are aligned, as shown in FIG. 6, the mobile phone screen 22 is translated downward to an assembling position to be assembled with the mobile phone middle frame.

When the machine vision system photographs the mobile phone screen and the mobile phone middle frame, the mobile phone screen and the mobile phone middle frame are at different height positions. Therefore, plane vision calibration needs to be separately performed on the mobile phone screen and the mobile phone middle frame, that is, a mapping relationship between a visual coordinate system on a plane on which the mobile phone screen is located and a mechanical motion coordinate system needs to be calibrated, and a mapping relationship between a visual coordinate system on a plane on which the mobile phone middle frame is located and a mechanical motion coordinate system needs to be calibrated.

Figure 7:
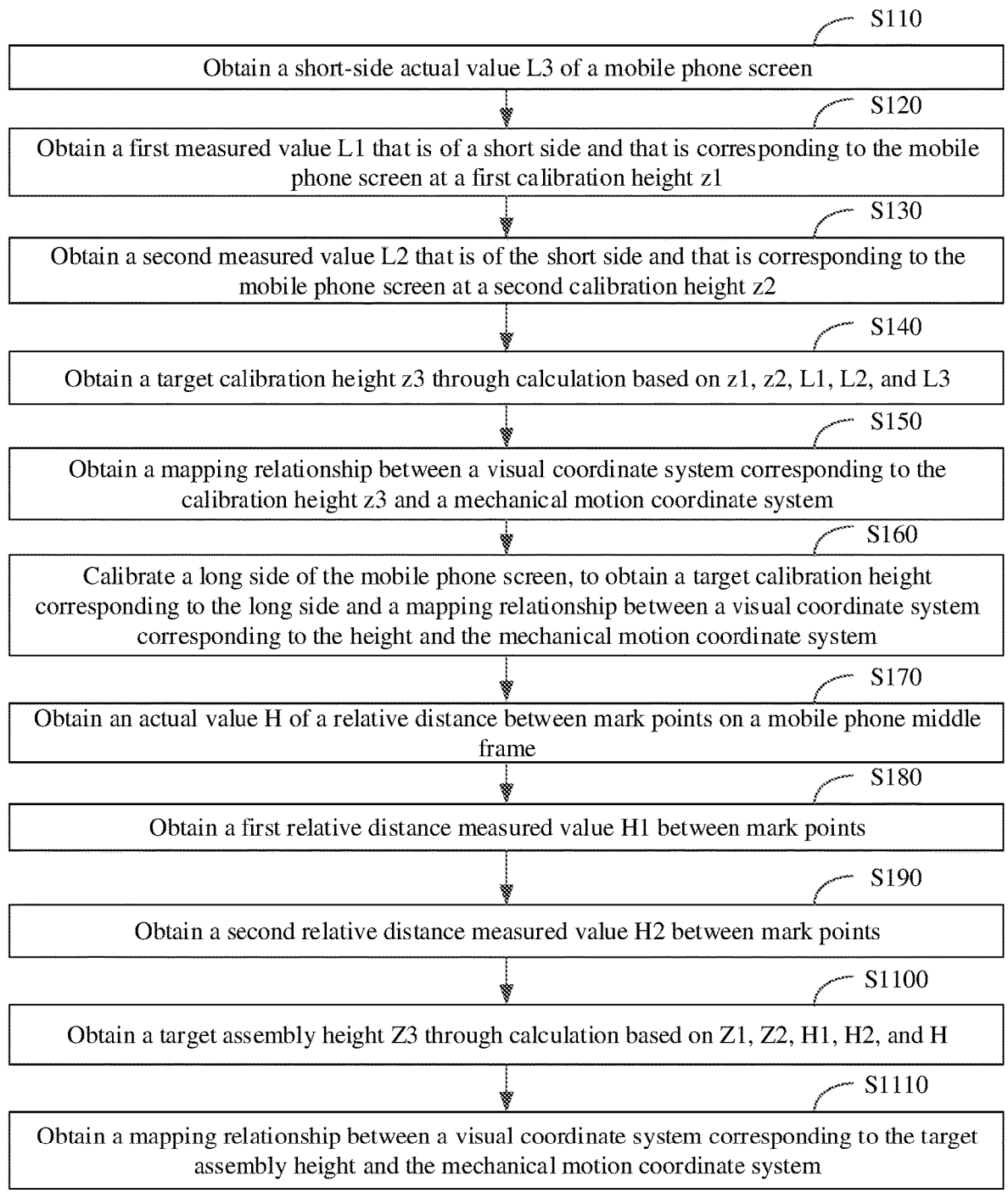
FIG. 7 is a flowchart of a coordinate system calibration method according to an embodiment of this application.

The following describes a mapping relationship between a visual coordinate system of a mobile phone screen and a mechanical motion coordinate system with reference to FIG. 7. As shown in FIG. 7, a coordinate system calibration method provided in this application is described in this embodiment by using an example of calibrating a short side of the mobile phone screen. The method may include the following steps.

S110. Obtain a short-side actual value L3 of the mobile phone screen by using a measurement tool.

The measurement tool may be a measurement apparatus that is independent of an automatic assembly device. For example, the measurement apparatus may grab the short side of the mobile phone screen, and shoot an image of grabbing the short side of the mobile phone screen. Further, a distance of the short side in the image is calculated to obtain the short-side actual value of the mobile phone screen.

S120. Obtain, based on a first mapping relationship between a visual coordinate system corresponding to a first calibration height and a mechanical motion coordinate system, a first measured value that is of the short side and that is corresponding to the mobile phone screen at the first calibration height.

The first calibration height is a height in a z-axis direction in the visual coordinate system (that is, an xyz coordinate system), and the first calibration height may be a randomly selected height. This is not limited in this application.

Figure 8:
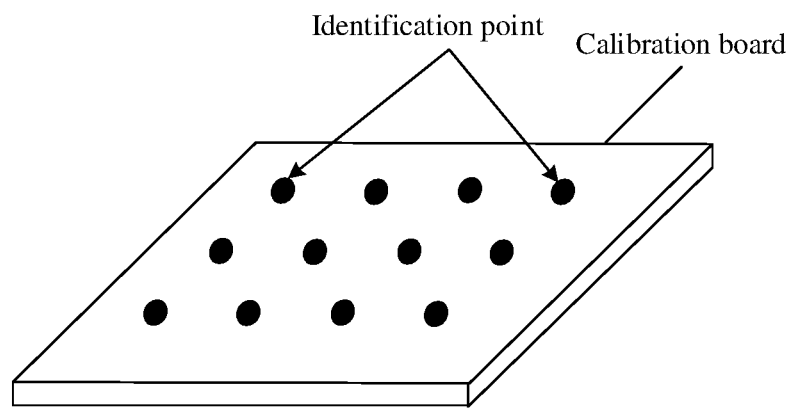
FIG. 8 is a schematic diagram of a calibration board according to an embodiment of this application.

When a mapping relationship between a visual coordinate system and a mechanical motion coordinate system (that is, an XYZ coordinate system) is obtained, a calibration board is used to replace an actual object (for example, the mobile phone screen). As shown in FIG. 8, identification points are disposed on the calibration board, and a distance between two adjacent identification points is fixed.

In an example embodiment, a process of obtaining a mapping relationship between a visual coordinate system corresponding to a specific calibration height (for example, the first calibration height) and a mechanical motion coordinate system is as follows.

(a) Position coordinates p1 of each identification point on the calibration board in the mechanical motion coordinate system are obtained.

(b) An image of the calibration board at the first calibration height is shot by using the camera and is denoted as an image A, and position coordinates p2 of each identification point in the image in the visual coordinate system and a quantity of pixels between the two identification points in the image are obtained.

(c) A mapping relationship, that is, a first mapping relationship, between the visual coordinate system and the mechanical motion coordinate system is obtained based on position coordinates p1 and p2 corresponding to a same identification point, an actual distance between two identification points, and the quantity of pixels between two identification points in the image A.

Both p1 and p2 are sets of position coordinates of a plurality of identification points.

It should be noted that an execution sequence of (a) and (b) is not limited in this application. For example, step (b) may be performed before step (a).

After the mapping relationship between the visual coordinate system corresponding to the first calibration height and the mechanical motion coordinate system is obtained, a process of obtaining the short-side measured value corresponding to the mobile phone screen at the first calibration height is as follows.

(a) The mobile phone screen is grabbed by using an operation mechanism, the mobile phone screen is placed at the first calibration height, and an image, that is, a first image, of the mobile phone screen at the height is shot by using the camera.

(b) The short-side measured value of the mobile phone screen, that is, the first measured value L1 of the short side, may be obtained through calculation based on the first mapping relationship corresponding to the first calibration height and a short-side pixel value of the mobile phone screen in the first image, that is, the measured value refers to a length obtained after a distance in the visual coordinate system is mapped to the mechanical motion coordinate system.

Figure 9:
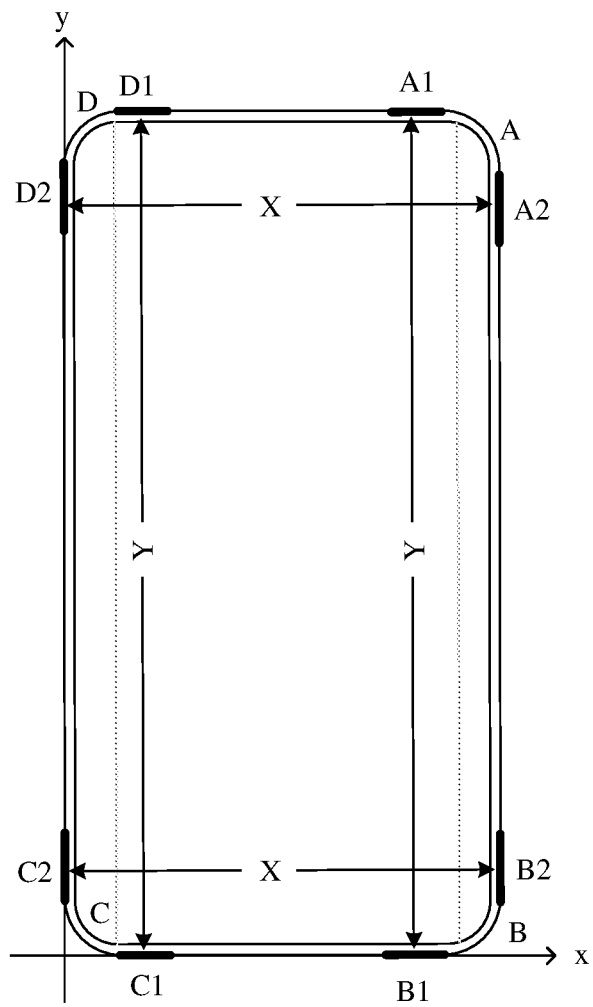
FIG. 9 is a schematic diagram of measurement of a size of a mobile phone screen in a visual coordinate system according to an embodiment of this application.

As shown in FIG. 9, the short side of the mobile phone screen is in an x-axis direction of the visual coordinate system, and a long side is in a y-axis direction.

B2 and C2 are respectively located on two long sides of the mobile phone screen, and y-axis coordinates of B2 and C2 are the same, that is, a connection line between B2 and C2 is parallel to the short side, that is, a distance between B2 and C2 is equal to a length of the short side. Therefore, the distance between B2 and C2 in the image of the mobile phone screen or a distance between A2 and D2 in the image is obtained, to finally obtain the short-side measured value of the mobile phone screen.

As shown in FIG. 9, B2 and C2 are located at one end in a long-side direction of the mobile phone, and A2 and D2 are located at the other end in the long-side direction of the mobile phone. Two groups of points, such as B2 and C2 and A2 and D2, that are located at two ends in the long-side direction are selected to separately calculate the short-side measured value. Further, the two short-side pixel values may be compared to determine whether the mobile phone screen is tilted. If the two short-side pixel values are equal, it indicates that the mobile phone screen is not tilted. If the two short-side pixel values are not equal, it indicates that the mobile phone screen is tilted. For example, an end with a smaller short-side pixel value is tilted downward, and an end with a larger short-side pixel value is tilted upward.

S130. Obtain, based on a second mapping relationship between a visual coordinate system corresponding to a second calibration height and a mechanical motion coordinate system, a second measured value L2 that is of the short side and that is corresponding to the mobile phone screen at the second calibration height.

A height value of the second calibration height is different from that of the first calibration height. For example, the second calibration height may be obtained by increasing or decreasing the first calibration height by a specific value.

A process of obtaining the second mapping relationship is the same as the process of obtaining the first mapping relationship, and details are not described herein again. A process of obtaining the second measured value is the same as the process of obtaining the first measured value, and details are not described herein again.

S140. Obtain a target calibration height corresponding to the short-side actual value L3 through calculation according to a trigonometric function principle based on the first calibration height z1, the first measured value L1, the second calibration height z2, and the second measured value L2.

The target calibration height means that a difference between a short-side measured value measured when the target object is at the height and a short-side actual value is less than a preset threshold. For example, the preset threshold may be determined according to an actual situation, for example, is determined according to actual assembly precision.

For objects at different z-direction height positions, sizes of images shot by the camera are different, and sizes of the objects in the images are different. There is a mapping relationship between a measured size of an object in a visual coordinate system and a measured size of the object in a mechanical motion coordinate system. Therefore, there is a mapping relationship between a z-direction height and a measured size of an object in a mechanical motion coordinate system.

Figure 10:
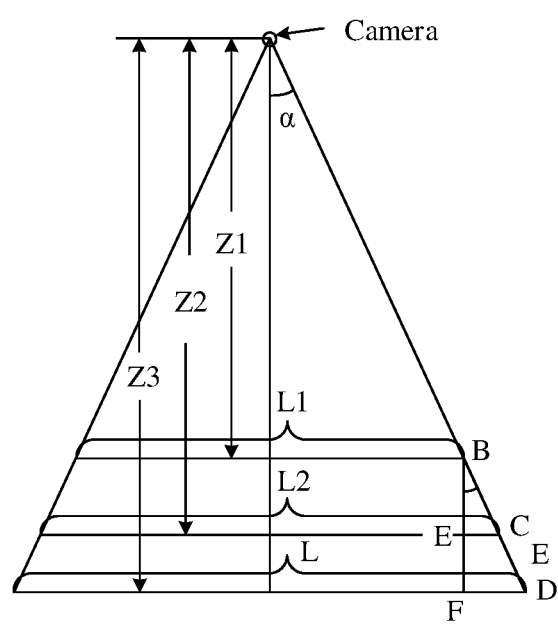
FIG. 10 is a schematic diagram of measured size values obtained when a same object is at different z-direction heights according to an embodiment of this application.

For ease of description, the measured size of the object in the mechanical motion coordinate system is used to replace the measured size of the object in the visual coordinate system. As shown in FIG. 10, when the mobile phone screen is at the first calibration height z1, a corresponding short-side measured value is L1, and when the mobile phone screen is at the second calibration height z2, a corresponding short-side measured value is L2.

It may be learned from FIG. 10 that an included angle between a photographing boundary line of the camera and a vertical line (that is, a straight line parallel to the z-axis) between the camera and the calibration plane is α, and a value of the included angle α does not change with a height of the calibration plane in the z direction.

The short-side actual value of the mobile phone screen is L3, and it is assumed that a z-direction height corresponding to the short-side actual value is z3 (that is, the target calibration height). In addition, it is assumed that a value relationship among z1, z2, and z3 and a value relationship among L1, L2, and L3 are shown in FIG. 10.

An included angle of a vertex B of a triangle BEC is equal to the included angle α. Similarly, an included angle of a vertex B of a triangle BFD is equal to the included angle α. It can be learned from the tangent function formula that tangent values of the included angles corresponding to the vertex B in the two triangles are equal, that is, there is a relationship shown in the following formula 1:

$$\frac{L2-L1}{2(z2-z1)} = \frac{L3-L1}{2(z3-z1)} \Rightarrow \frac{L2-L1}{z2-z1} = \frac{L3-L1}{z3-z1} \quad (1)$$

A value of the target calibration height z3 may be calculated according to the formula 1, as shown in a formula 2:

$$z3 = \frac{(z2-z1)(L3-L1)}{L2-L1} + z1 \quad (2)$$

S150. Obtain a third mapping relationship between a visual coordinate system corresponding to the target calibration height and a mechanical motion coordinate system by using the calibration board.

After the target calibration height is obtained through calculation, the operation mechanism is controlled to place the calibration board at the target calibration height, and an image of the calibration board is shot by using the camera. Further, a mapping relationship, that is, a third mapping relationship, between position coordinates of each identification point in the image and each identification point in the mechanical motion coordinate system is determined.

A short-side direction of the mobile phone screen is curved, and a long-side direction is planar. Therefore, the target calibration height and the coordinate system mapping relationship obtained after the short side of the mobile phone screen is calibrated are not applicable to the long-side direction. That is, an error exists between a long-side actual value of the mobile phone screen and a long-side length obtained through calculation by using the target calibration height and the coordinate system mapping relationship corresponding to the short side. Therefore, the long side still needs to be calibrated after the short side is calibrated.

A calibration sequence of the long side and the short side is not limited. The long side may be calibrated before the short side, or the short side may be calibrated before the long side.

S160. Perform a long-side calibration process for the mobile phone screen, to obtain a target calibration height corresponding to the long side of the mobile phone screen and a mapping relationship between a visual coordinate system corresponding to the height and a mechanical motion coordinate system.

The long-side calibration process of the mobile phone screen is similar to the short-side calibration process. The long-side calibration process of the mobile phone screen is as follows.

(1) A long-side actual value L6 of the mobile phone screen is obtained by using the measurement tool.

(2) A fourth mapping relationship between a visual coordinate system corresponding to a third calibration height z4 and a mechanical motion coordinate system is obtained, and a first long-side measured value L4 corresponding to the mobile phone screen at the third calibration height z4 is further obtained.

(3) A fifth mapping relationship between a visual coordinate system corresponding to a fourth calibration height z5 and a mechanical motion coordinate system is obtained, and a second long-side measured value L5 corresponding to the mobile phone screen at the fourth calibration height z5 is further obtained.

As shown in FIG. 9, the long-side measured value is obtained through calculation by measuring a distance between A1 and B1 (or D1 and C1).

The third calibration height z4 and the fourth calibration height z5 may be two different randomly selected z-direction heights, and a value relationship between z4 and z5 is not limited in this application. For example, z4 may be greater than z5, or z4 may be less than z5.

(4) A corresponding calibration height when the long-side measured value matches the long-side actual value, that is, a target calibration height z6 corresponding to the long side, is obtained through calculation according to a formula 3:

$$z6 = \frac{(z5 - z4)(L6 - L4)}{L5 - L4} + z4 \qquad (3)$$

(5) A mapping relationship, that is, a sixth mapping relationship, between a visual coordinate system and a mechanical motion coordinate system when the calibration board is located at the target calibration height corresponding to the long side is obtained.

It should be noted that an execution sequence of (1)~(5) may be set according to an actual requirement. This is not limited in this application.

In this embodiment, the long side and the short side of the mobile phone screen are first calibrated, and then the mobile phone middle frame is calibrated. Certainly, in another embodiment, the mobile phone middle frame may be calibrated first, and then the short side and the long side of the mobile phone screen are calibrated. This is not limited in this application.

In another embodiment of this application, for a same calibration height, both a short-side measured value and a long-side measured value of the mobile phone screen may be obtained.

For example, when the mobile phone screen is at the first calibration height z1, a first long-side measured value and a first short-side measured value that are corresponding to the mobile phone screen are obtained. Similarly, when the mobile phone screen is at the second calibration height z2, a second long-side measured value and a second short-side measured value that are corresponding to the mobile phone screen are obtained.

As described above, long-side measured values and short-side measured values that are corresponding to two different calibration heights are obtained, and the mobile phone screen needs to be placed at only two different calibration heights, but the mobile phone screen does not need to be placed at four calibration heights. In this way, time consumed in separately placing the mobile phone screen at two different calibration heights can be reduced. Therefore, total time consumed in the long-side calibration process and the short-side calibration process is shortened, and calibration efficiency is improved.

In an example embodiment of this application, in a process of assembling the mobile phone screen and the mobile phone middle frame, to avoid that downward pressure of the operation mechanism is overpressure or underpressure, the mobile phone middle frame may be further calibrated by using the foregoing calibration method, that is, a target assembly height of the mobile phone middle frame and the mobile phone screen is obtained.

S170. Obtain a mark point distance actual value H of the mobile phone middle frame.

Figure 11:
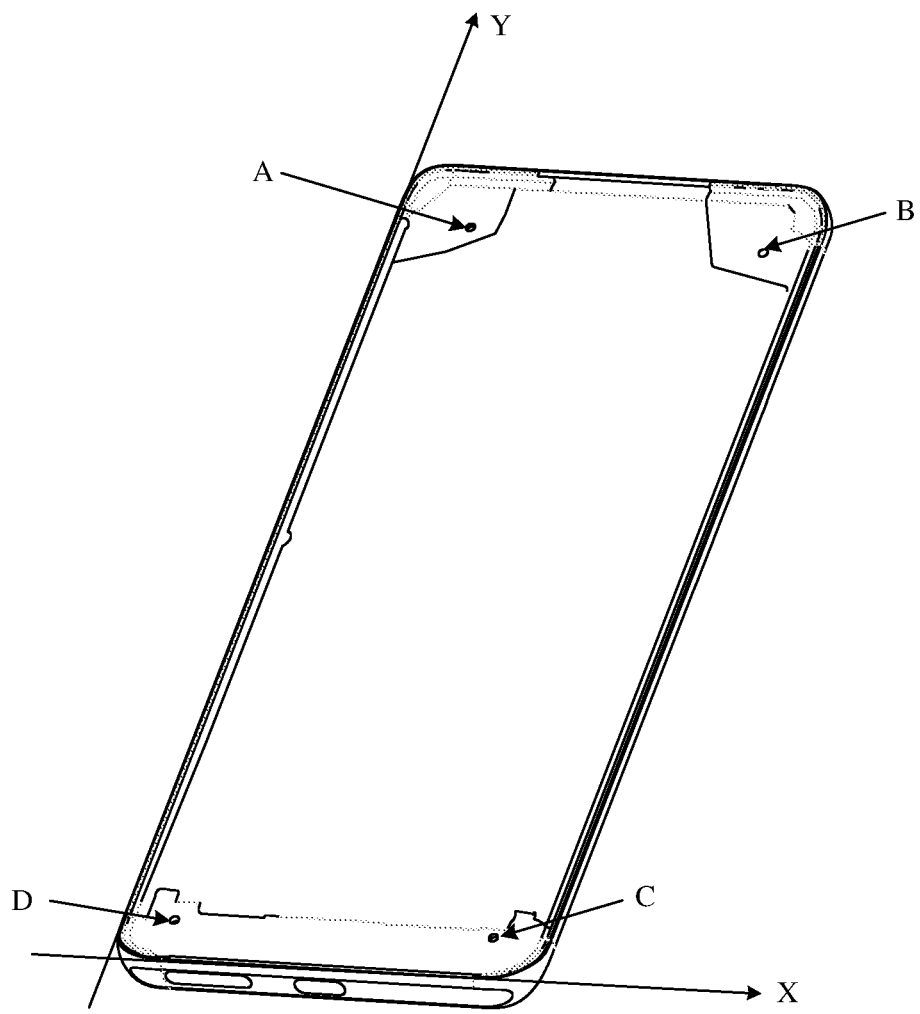
FIG. 11 is a schematic diagram of a mark point on a calibration plane of a mobile phone middle frame according to an embodiment of this application.

A calibration plane of the mobile phone middle frame includes a plurality of mark points. As shown in FIG. 11, four through holes A, B, C, and D on the mobile phone middle frame may be used as mark points.

In an example embodiment, each mark point distance actual value of the mobile phone middle frame is measured by using another measurement apparatus independent of the automatic assembly device.

A measurement principle of the measurement apparatus for measuring a mark point distance actual value is also that the camera is used to shoot an image of the mobile phone middle frame, to obtain the mark point distance actual value. For example, the mobile phone middle frame is placed at an actual assembly height, and an image corresponding to the mobile phone middle frame at this height is shot, to obtain the mark point distance actual value.

As shown in FIG. 11, a long side of the mobile phone middle frame is in a Y-axis direction, and a short side is in an X-axis direction.

For example, a relative distance between mark points refers to a relative distance between two points A and B in the Y-axis direction, a relative distance between two points C and D in the Y-axis direction, a relative distance between two points A and D in the X-axis direction, and a relative distance between two points B and C in the X-axis direction. A relative distance between two mark points may be obtained through calculation by using position coordinates of the mark points measured by the measurement apparatus. Relative distances between A and B, B and C, C and D, and A and D may be selected during calibration.

Figure 12:
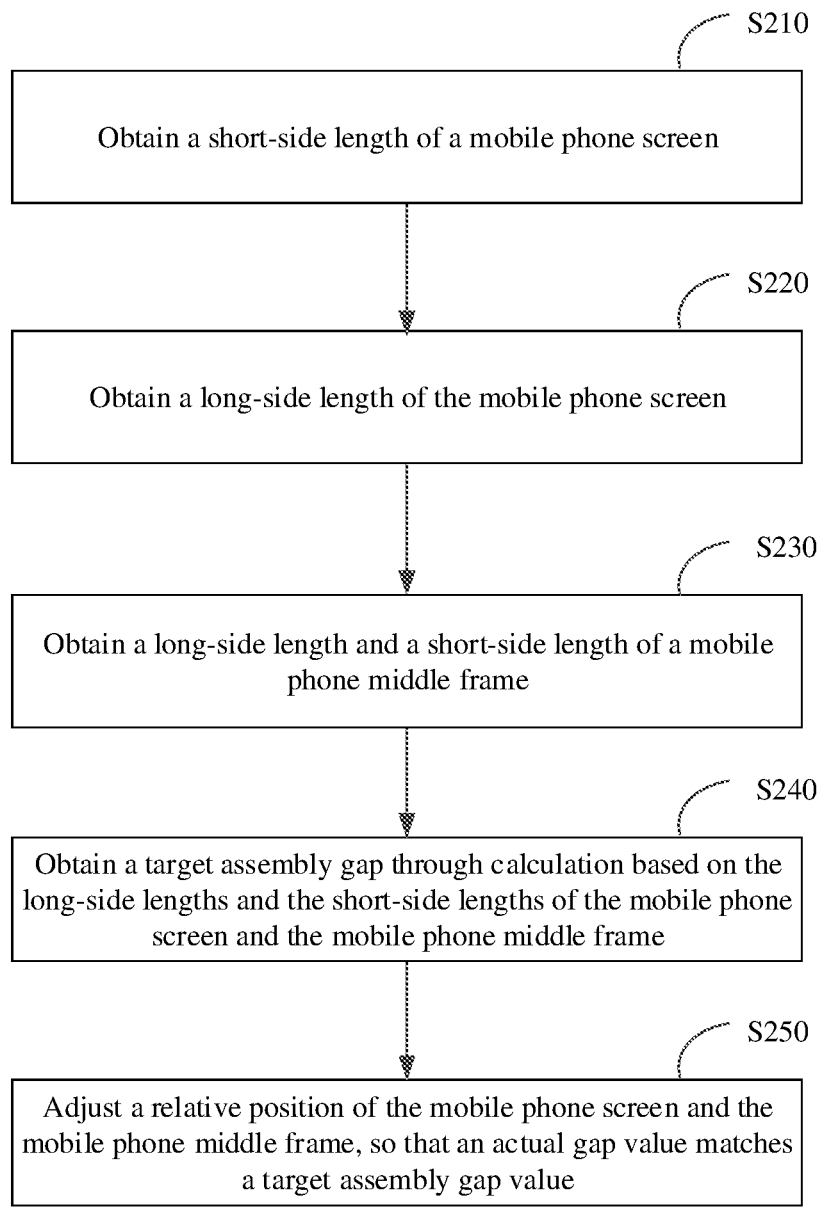
FIG. 12 is a flowchart of a process of determining a target assembly gap according to an embodiment of this application.

For example, position coordinates of the four mark points A, B, C, and D are successively (Xa, Ya), (Xb, Yb), (Xc, Yc), and (Xd, Yd). As shown in FIG. 12, the relative distance between the two points A and B in the Y-axis direction is an absolute value of a difference between Y-axis coordinates of the point A and the point B, that is, the relative distance L between the two points A and B is equal to |Ya−Yb|. Similarly, the relative distance W between the two points B and C in the X-axis direction is equal to |Xb−Xc|, the relative distance between the two points C and D in the Y-axis direction is |Yc−Yd|, and the relative distance between the two points A and D in the X-axis direction is |Xa−Xd|.

S180. Obtain, based on a mapping relationship, that is, a sixth mapping relationship, between a visual coordinate system corresponding to a first assembly height Z1 and a mechanical motion coordinate system, a mark point relative distance measured value corresponding to the mobile phone middle frame at Z1, that is, a first relative distance measured value.

The mobile phone middle frame is grabbed to the height Z1, and an image of the mobile phone middle frame is shot by using the camera, to obtain a mark point relative distance in the image. Further, a mark point relative distance in the visual coordinate system is mapped to the mechanical motion coordinate system by using the mapping relationship between the visual coordinate system corresponding to the height Z1 and the mechanical motion coordinate system, to obtain the first relative distance measured value.

S190. Obtain, based on a mapping relationship, that is, a seventh mapping relationship, between a visual coordinate system corresponding to a second assembly height Z2 and a mechanical motion coordinate system, a mark point relative distance measured value corresponding to the mobile phone middle frame at Z2, that is, a second relative distance measured value.

A manner of obtaining the second relative distance measured value is the same as the manner of obtaining the first relative distance measured value, and details are not described herein again.

S1100. Obtain a target assembly height corresponding to a relative distance actual value through calculation based on the first assembly height, the first relative distance measured value, the second assembly height, the second relative distance measured value, and the relative distance actual value.

A mark point relative distance measured value corresponding to the mobile phone middle frame at the target assembly height matches the mark point relative distance actual value, for example, an error thereof is less than a preset threshold.

In this step, the target assembly height Z3 may be obtained through calculation by using the following formula 4:

$$Z3 = \frac{(Z2 - Z1)(H - H1)}{H2 - H1} + Z1 \quad (4)$$

In the formula 4, Z1 is the first assembly height, H1 is the mark point relative distance measured value corresponding to the mobile phone middle frame at the height Z1, Z2 is the second assembly height, H2 is the mark point relative distance measured value corresponding to the mobile phone middle frame at the height Z2, H is the mark point relative distance actual value of the mobile phone middle frame, and Z3 is the target assembly height.

S1110. Obtain an eighth mapping relationship between a visual coordinate system corresponding to the target assembly height and a mechanical motion coordinate system.

The calibration board is used to replace the mobile phone middle frame, the operation mechanism places the calibration board at the target assembly height, an image of the calibration board (there is an identification point on the calibration board) is shot by using the camera, and a mapping relationship between position coordinates of each identification point in a visual coordinate system and each identification point in a mechanical motion coordinate system, that is, the eighth mapping relationship, is further determined.

In an assembly process, the mobile phone middle frame is placed at the target assembly height, the image of the mobile phone middle frame is shot by using the camera, and a long-side length and a short-side length of the mobile phone middle frame are further measured based on the eighth mapping relationship corresponding to the target assembly height.

According to the coordinate system calibration method provided in this embodiment, for a target object whose surface is curved, such as a curved mobile phone screen, short-side measured values corresponding to the mobile phone screen at two different calibration heights are obtained. Based on a trigonometric function principle, a target calibration height corresponding to a short-side actual value is obtained through calculation by using the short-side measured values corresponding to the two different calibration heights. A coordinate system calibration process corresponding to the short side needs to be performed for the target calibration height only once, to obtain a mapping relationship between a visual coordinate system corresponding to a short-side actual value and a mechanical motion coordinate system. Similarly, a long side of the mobile phone screen is calibrated to obtain a target calibration height that makes a long-side measured value equal to a long-side actual value, and then a mapping relationship between a visual coordinate system and a mechanical motion coordinate system is obtained for the target calibration height. Based on a same principle, calibration is performed on a mark point on the mobile phone middle frame to obtain a target assembly height corresponding to a mark point relative distance actual value, so as to further obtain a coordinate system mapping relationship corresponding to the target assembly height. It can be learned from the foregoing content that, in this solution, a target calibration height that makes a measured value of a measured parameter equal to an actual value may be obtained based on measured values of the measured parameter at any two calibration heights, and only a mapping relationship between a visual coordinate system corresponding to the target calibration height and a mechanical motion coordinate system needs to be obtained, but a calibration height does not need to be repeatedly adjusted a plurality of times to perform a coordinate system calibration process. Therefore, the solution reduces complexity of a coordinate system calibration process, and improves coordinate system calibration efficiency.

In another embodiment of this application, after the mobile phone screen and the mobile phone middle frame are calibrated, coordinate system mapping relationships obtained through calibration are used to obtain measured values of long sides and short sides of the mobile phone screen and the mobile phone middle frame. Further, a target assembly gap between the mobile phone screen and the mobile phone middle frame is obtained through calculation based on measured values of four sides of the mobile phone screen and measured values of four sides of the mobile phone middle frame, and the mobile phone screen and the mobile phone middle frame are assembled based on the target assembly gap. As shown in FIG. 12, an automatic assembly process is as follows.

S210. Place the mobile phone screen at a target calibration height corresponding to a short side, and obtain a short-side length of the mobile phone screen.

The mobile phone screen is placed at the target calibration height corresponding to the short side, an image of the mobile phone screen is shot, and a short-side length in the image of the mobile phone screen is mapped to a mechanical motion coordinate system by using a coordinate system mapping relationship corresponding to the target calibration height, to obtain the short-side length.

S220. Place the mobile phone screen at a target calibration height corresponding to a long side, and obtain a long-side length of the mobile phone screen.

Similarly, the mobile phone screen is placed at the target calibration height corresponding to the long side, and a long-side length in the image of the mobile phone screen is mapped to the mechanical motion coordinate system, to obtain the long-side length.

S230. Place the mobile phone middle frame at a target assembly height, and obtain a long-side length and a short-side length of the mobile phone middle frame.

In an example embodiment of this application, a measurement apparatus configured to measure a mark point relative distance may further measure a size between each mark point and a long or short frame of the mobile phone middle frame.

Figure 13:
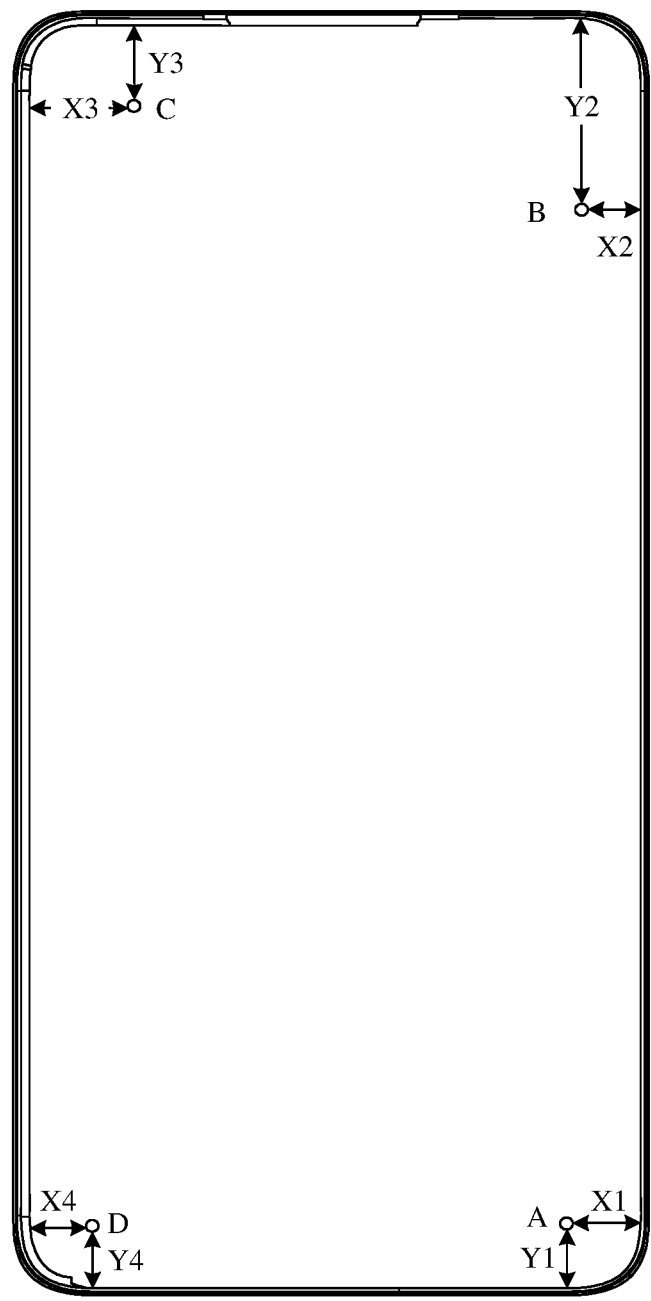
FIG. 13 is a schematic diagram of a distance between a mark point and a frame on a calibration plane of a mobile phone middle frame according to an embodiment of this application.

For example, as shown in FIG. 13, measured size parameters of a mark point A is X1 and Y1, where X1 is a distance between the mark point and a nearest long frame, and Y1 is a distance between the mark point A and a nearest short frame. Similarly, X2 and Y2 are distances between a mark point B and a nearest long frame and short frame; X3 and Y3 are distances between a mark point C and a nearest long frame and short frame; X4 and Y4 are distances between a mark point D and a nearest long frame and short frame.

Further, a long-side length value of the mobile phone middle frame is obtained through calculation based on a formula L+Y1+Y2 and the distances Y1 and Y2 between the two points A and B and the nearest short frames. Similarly, the long-side length of the mobile phone middle frame may be obtained through calculation based on a relative distance between the two points C and D, Y3, and Y4.

A manner of obtaining the short-side length of the mobile phone middle frame is the same as the manner of obtaining the long-side length. As shown in FIG. 12, the short-side length of the mobile phone middle frame is obtained through calculation based on W+X2+X3 according to a relative distance W between the two points B and C, X2, and X3.

In addition, an execution sequence of S210~S230 is not limited in this embodiment of this application.

S240. Obtain a target assembly gap value through calculation based on the long-side lengths and the short-side lengths of the mobile phone screen and the mobile phone middle frame.

A difference between the long-side lengths of the mobile phone middle frame and the mobile phone screen is calculated, and a difference between the short-side lengths of the mobile phone middle frame and the mobile phone screen is calculated.

A quarter value of a sum of the long-side difference and the short-side difference is calculated, that is, (long-side difference+short-side difference)/4, and is used as the target assembly gap.

Figure 14:
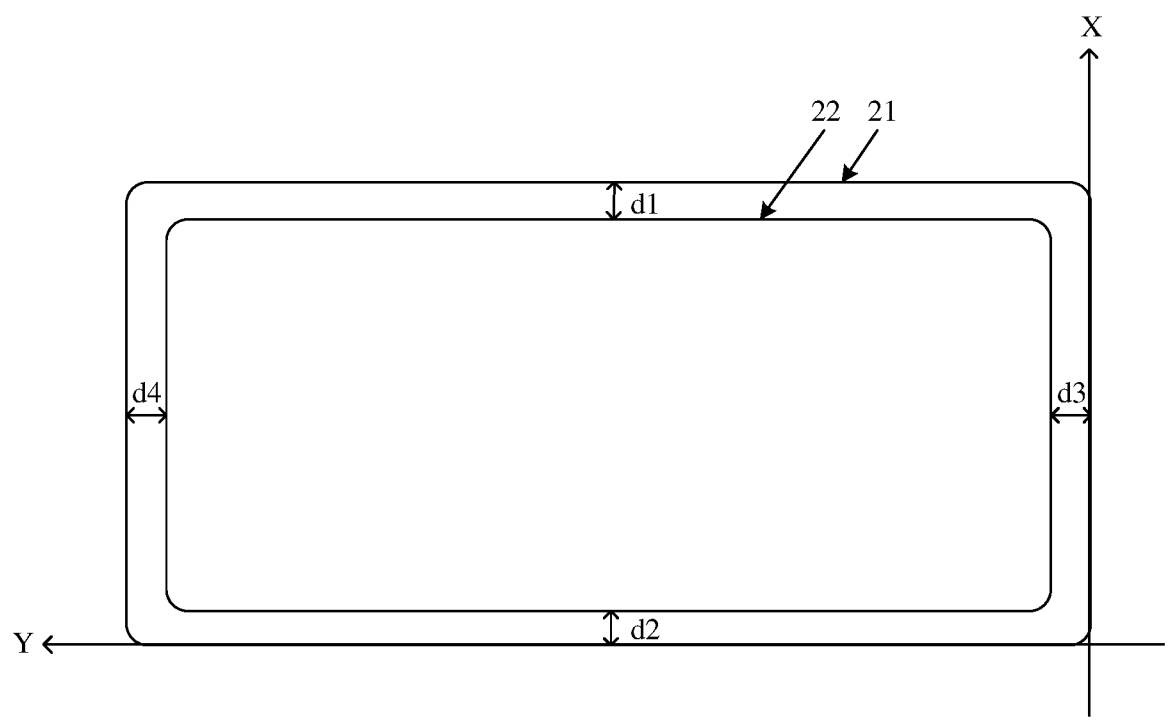
FIG. 14 is a schematic diagram of a gap between a mobile phone screen and a mobile phone middle frame according to an embodiment of this application.

As shown in FIG. 14, gap values corresponding to four groups of sides of the mobile phone screen 22 and the mobile phone middle frame 21 are respectively d1, d2, d3, and d4. The target assembly gap obtained in this embodiment can make the four gap values equal.

For example, the long-side length of the mobile phone middle frame is 100, and the short-side length of the mobile phone middle frame is 80. The long-side length of the mobile phone screen is 90, and the short-side length of the mobile phone screen is 70. In this case, the long-side difference is 10, the short-side difference is 10, and the target assembly gap is 5. That is, d1=d2=d3=d4=5 in FIG. 14.

S250. Adjust a relative position of the mobile phone screen and the mobile phone middle frame, so that an actual gap value of the mobile phone screen and the mobile phone middle frame matches the target assembly gap value.

When the mobile phone screen and the mobile phone middle frame are assembled, actual gap values corresponding to four groups of sides of the mobile phone screen and the mobile phone middle frame are obtained, and a position of the mobile phone screen is adjusted based on each actual gap value and the target assembly gap, so that the actual gap values corresponding to the four groups of sides finally reach the target assembly gap value. For example, an error between the actual gap value and the target assembly gap value is less than a preset threshold.

It is assumed that the target assembly gap is 5, and the actual gap values corresponding to the four groups of sides are successively d1=3, d2=7, d3=4, and d4=6. XY-axis coordinate directions shown in FIG. 14 are used as an example for description. In this case, the mobile phone screen needs to be moved by 1 in a Y-axis positive direction and 2 in an X-axis negative direction, so that the actual gap values corresponding to the four groups of sides are finally even.

According to the automatic assembly method provided in this embodiment, the long-side lengths and the short-side lengths of the mobile phone screen and the mobile phone middle frame are measured by using calibration results of the mobile phone screen and the mobile phone middle frame, and the target assembly gap between the mobile phone screen and the mobile phone middle frame is further obtained through calculation. Finally, four gaps existing after the mobile phone screen and the mobile phone middle frame are assembled are evenly distributed, and an error of the assembly gap is reduced.

In embodiments of this application, the automatic assembly device may be divided into function modules according to the foregoing method examples. For example, each function module may be obtained through division based on each corresponding function, or two or more functions may be integrated into one processing module. The integrated module may be implemented in a form of hardware, or may be implemented in a form of a software function module. It should be noted that division into the modules in embodiments of this application is an example, and is merely logical function division. In actual implementation, there may be another division manner.

Figure 15:
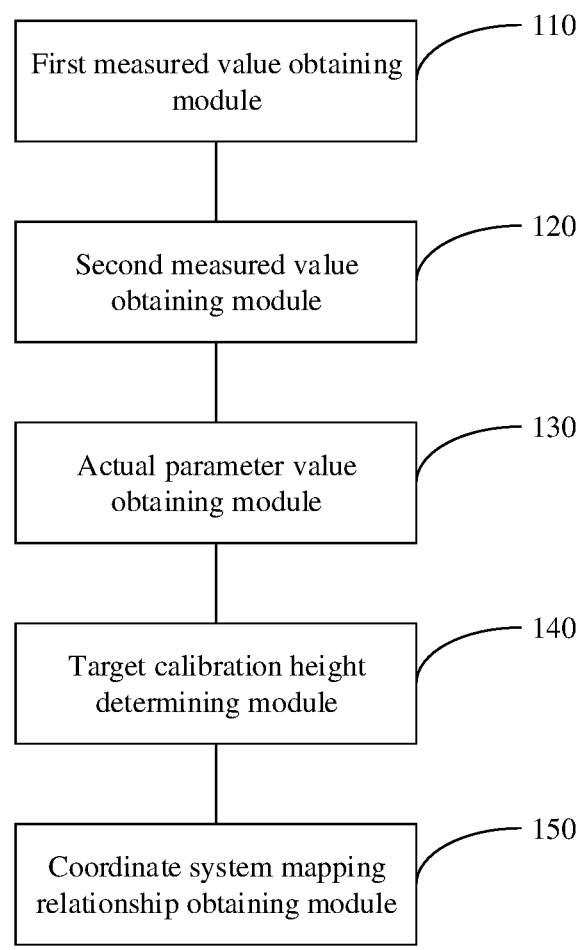
FIG. 15 is a possible schematic diagram of a coordinate system calibration apparatus according to an embodiment of this application.

In a case in which each function module is obtained through division based on each corresponding function, FIG. 15 is a possible schematic diagram of composition of a coordinate system calibration apparatus related to the foregoing embodiments. The coordinate system calibration apparatus can perform steps of any coordinate system calibration method embodiment in the method embodiments of this application. The coordinate system calibration apparatus may be an automatic assembly device, or a chip system that supports the automatic assembly device in implementing the method provided in the foregoing coordinate system calibration method embodiment.

As shown in FIG. 15, the coordinate system calibration apparatus may include:
- a first measured value obtaining module 110, configured to obtain a first measured value corresponding to a measured parameter of a target object at a first calibration height;
- a second measured value obtaining module 120, configured to obtain a second measured value corresponding to the measured parameter of the target object at a second calibration height;
- an actual parameter value obtaining module 130, configured to obtain an actual value corresponding to the measured parameter of the target object;
- a target calibration height determining module 140, configured to obtain, based on the first measured value and the second measured value that are corresponding to the measured parameter, the first calibration height, and the second calibration height, a target calibration height that matches the actual value of the measured parameter; and
- a coordinate system mapping relationship obtaining module 150, configured to obtain a mapping relationship between a visual coordinate system corresponding to the target calibration height and a mechanical motion coordinate system.

It should be noted that all related content of each step in the foregoing method embodiment may be cited to a function description of a corresponding function module, and details are not described herein again.

The coordinate system calibration apparatus provided in this embodiment of this application is configured to perform the coordinate system calibration method in any one of the foregoing embodiments. Therefore, a same technical effect as that in the coordinate system calibration method in the foregoing embodiments can be achieved.

An embodiment further provides a computer-readable storage medium. The computer-readable storage medium includes instructions. When the instructions are run on an electronic device, the electronic device is enabled to perform related method steps shown in FIG. 7, to implement the coordinate system calibration method in the foregoing embodiment.

An embodiment further provides a computer program product including instructions. When the computer program product runs on an electronic device, the electronic device is enabled to perform related method steps in the method embodiment shown in FIG. 7, to implement the coordinate system calibration method in the foregoing embodiment.

Figure 16:
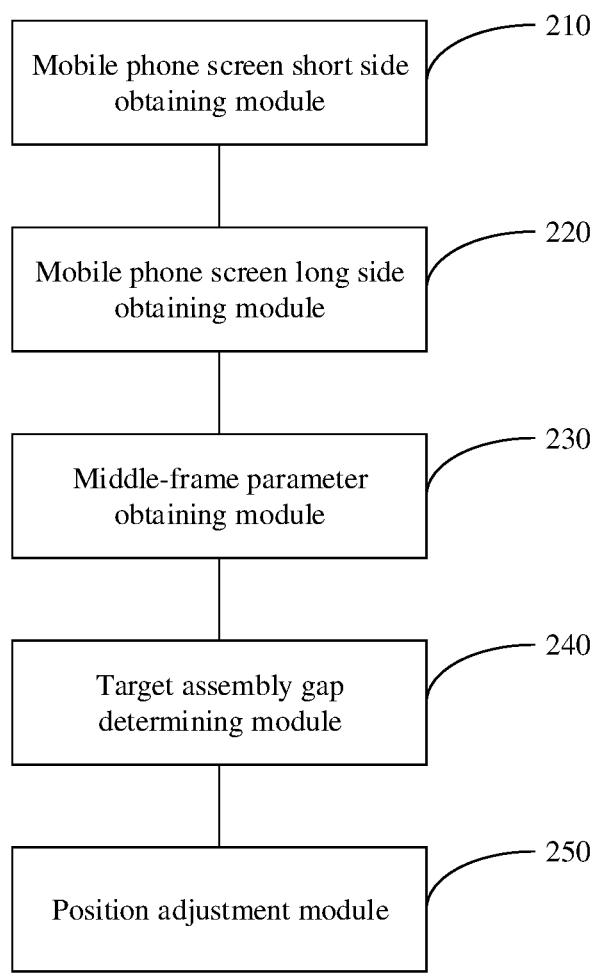
FIG. 16 is a possible schematic diagram of an automatic assembly apparatus according to an embodiment of this application.

FIG. 16 is a possible schematic diagram of an automatic assembly apparatus according to an embodiment of this application. The automatic assembly apparatus is configured to assemble a mobile phone screen and a mobile phone middle frame. The automatic assembly apparatus may be an automatic assembly device, or a chip system that supports the automatic assembly device in implementing the method provided in the foregoing automatic assembly method embodiment.

As shown in FIG. 16, the automatic assembly apparatus may include:
- a mobile phone screen short side obtaining module 210, configured to place the mobile phone screen at a short-side target calibration height, and obtain a short-side length value of the mobile phone screen based on a coordinate system mapping relationship corresponding to the short-side target calibration height;
- a mobile phone screen long side obtaining module 220, configured to place the mobile phone screen at a long-side target calibration height, and obtain a long-side length value of the mobile phone screen based on a coordinate system mapping relationship corresponding to the long-side target calibration height;
- a middle-frame parameter obtaining module 230, configured to place the mobile phone middle frame at a middle-frame target calibration height, and obtain a long-side length value and a short-side length value of the mobile phone middle frame based on a coordinate system mapping relationship corresponding to the middle-frame target calibration height;
- a target assembly gap determining module 240, configured to determine a target assembly gap value based on the long-side length value and the short-side length value of the mobile phone screen and the long-side length value and the short-side length value of the mobile phone middle frame; and
- a position adjustment module 250, configured to adjust a relative position of the mobile phone screen and the mobile phone middle frame, so that an actual gap value of the mobile phone screen and the mobile phone middle frame matches the target assembly gap value.

The short-side target calibration height, the long-side target calibration height, the middle-frame target calibration height, and a coordinate system mapping relationship corresponding to each calibration height are obtained by using the coordinate system calibration method in the foregoing embodiments.

It should be noted that all related content of each step in the foregoing method embodiment may be cited to a function description of a corresponding function module, and details are not described herein again.

The automatic assembly apparatus provided in this embodiment of this application is configured to perform the automatic assembly method in any one of the foregoing embodiments. Therefore, a same technical effect as that in the automatic assembly method in the foregoing embodiments can be achieved.

An embodiment further provides a computer-readable storage medium. The computer-readable storage medium includes instructions. When the instructions are run on an automatic assembly device, the device is enabled to perform related method steps shown in FIG. 7 or FIG. 12, to implement the automatic assembly method in the foregoing embodiment.

An embodiment further provides a computer program product including instructions. When the computer program product runs on an automatic assembly device, the device is enabled to perform related method steps in the method embodiment shown in FIG. 7 or FIG. 12, to implement the automatic assembly method in the foregoing embodiment.

It may be clearly learned by a person skilled in the art from the foregoing description of the implementations that, for convenience and brevity of description, division into only the foregoing function modules is used as an example for description. In actual application, the foregoing functions may be allocated to different function modules for implementation according to a requirement, that is, an internal structure of an apparatus is divided into different function modules, to complete all or some of the functions described above. For a specific working process of the foregoing described system, apparatus, and unit, refer to a corresponding process in the foregoing method embodiments, and details are not described herein again.

In the several embodiments provided in the embodiments, it should be understood that the disclosed coordinate system calibration method, automatic assembly method, and apparatus may be implemented in other manners. For example, the described apparatus embodiments are merely examples. For example, division into the modules or units is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may or may not be physical units, may be located in one place, or may be distributed on a plurality of network units. Some or all of the units may be selected according to an actual requirement to achieve the objectives of the solutions in the embodiments.

In addition, function units in the embodiments may be integrated into one processing unit, or each unit may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of the embodiments essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments. The foregoing storage medium includes any medium that can store program code, such as a flash memory, a removable hard disk, a read-only memory, a random access memory, a magnetic disk, or an optical disc.

The foregoing descriptions are merely specific implementations of this application. However, the protection scope of this application is not limited thereto. Any change or replacement within the technical scope disclosed in this application shall fall within the protection scope of this application. Therefore, the protection scope of this application shall be subject to the protection scope of the claims.

What is claimed is:

1. A method, applied to an automatic assembly device, wherein the method comprises:
   clamping, by a clamping mechanism of the automatic assembly device, a target object, and placing the target object at a first calibration height in response to a first motion control instruction generated by one or more processors of the automatic assembly device;
   obtaining, by one or more cameras of the automatic assembly device, an image corresponding to the target object at the first calibration height in response to a first photographing instruction generated by the one or more processors;
   obtaining, by the one or more processors, the image corresponding to the target object at the first calibration height, and obtaining a first measured value corresponding to a measured parameter of a target object at the first calibration height;
   obtaining, by the one or more processors, an image corresponding to the target object at a second calibration height, and obtaining a second measured value corresponding to the measured parameter of the target object at the second calibration height;
   obtaining, by the one or more processors, an actual value corresponding to the measured parameter of the target object;
   obtaining, by the one or more processors based on the first measured value and the second measured value that are corresponding to the measured parameter, the first calibration height, and the second calibration height, a target calibration height that matches the actual value of the measured parameter; and
   obtaining, by the one or more processors, a mapping relationship between a visual coordinate system corresponding to the target calibration height and a mechanical motion coordinate system.

2. The method according to claim 1, wherein obtaining, by the one or more processors based on the first measured value and the second measured value that are corresponding to the measured parameter, the first calibration height, and the second calibration height, the target calibration height that matches the actual value of the measured parameter comprises:
   calculating a first measured difference between the first measured value and the second measured value of the measured parameter, and calculating a first height difference between the first calibration height and the second calibration height;
   calculating a ratio of the first measured difference to the first height difference; and
   obtaining, through calculation based on algebraic expressions that have equal ratios and that are corresponding to the first calibration height and the second calibration height, the target calibration height that matches the actual value of the measured parameter.

3. The method according to claim 1, wherein obtaining, by the one or more processors based on the first measured value and the second measured value that are corresponding to the measured parameter, the first calibration height, and the second calibration height, the target calibration height that matches the actual value of the measured parameter comprises:
   obtaining the target calibration height through calculation according to the following formula:

$$z3 = \frac{(z2-z1)(L3-L1)}{L2-L1} + z1,$$

wherein
   $z3$ is the target calibration height, $z2$ is the second calibration height, $z1$ is the first calibration height, $L3$ is the actual value of the measured parameter, $L2$ is the second measured value of the measured parameter, and $L1$ is the first measured value of the measured parameter.

4. The method according to claim 1, wherein obtaining, by the one or more processors, the mapping relationship between the visual coordinate system corresponding to the target calibration height and the mechanical motion coordinate system comprises:
   obtaining a visual coordinate position corresponding to an identification point on a calibration board at the target calibration height;
   obtaining a mechanical coordinate position corresponding to the identification point; and
   determining, based on the visual coordinate position and the mechanical coordinate position that are corresponding to the identification point, the mapping relationship between the visual coordinate system corresponding to the target calibration height and the mechanical motion coordinate system.

5. The method according to claim 1, wherein obtaining the first measured value corresponding to the measured parameter of the target object at the first calibration height comprises:
   obtaining a visual measured value that is of the measured parameter in the visual coordinate system and that is corresponding to the target object at the first calibration height; and
   converting the visual measured value into a measured value corresponding to the mechanical motion coordinate system based on a first mapping relationship between a visual coordinate system corresponding to the first calibration height and the mechanical motion coordinate system, to obtain the first measured value.

6. The method according to claim 1, wherein the target object is a mobile phone curved screen, and the measured parameter comprises a short-side length of the mobile phone curved screen.

7. The method according to claim 6, wherein the measured parameter further comprises a long-side length of the mobile phone curved screen.

8. The method according to claim 1, wherein the target object is a mobile phone middle frame, and the measured parameter comprises an identification point relative distance on the mobile phone middle frame.

9. The method according to claim 1, wherein the clamping mechanism comprises a manipulator and a support platform.

10. An automatic assembly method, used to assemble a mobile phone screen and a mobile phone middle frame, wherein the method comprises:
    placing the mobile phone screen at a short-side target calibration height, and obtaining a short-side length value of the mobile phone screen based on a coordinate system mapping relationship corresponding to the short-side target calibration height;
    placing the mobile phone screen at a long-side target calibration height, and obtaining a long-side length value of the mobile phone screen based on a coordinate system mapping relationship corresponding to the long-side target calibration height;
    placing the mobile phone middle frame at a middle-frame target calibration height, and obtaining a long-side length value and a short-side length value of the mobile phone middle frame based on a coordinate system mapping relationship corresponding to the middle-frame target calibration height;
    determining a target assembly gap value based on the long-side length value and the short-side length value of the mobile phone screen and the long-side length value and the short-side length value of the mobile phone middle frame; and
    adjusting a relative position of the mobile phone screen and the mobile phone middle frame, so that an actual gap value of the mobile phone screen and the mobile phone middle frame matches the target assembly gap value, wherein
    the coordinate system mapping relationship corresponding to the short-side target calibration height, the coordinate system mapping relationship corresponding to the long-side target calibration height and the coordinate system mapping relationship corresponding to the middle-frame target calibration height are obtained by:
        obtaining a first measured value corresponding to a measured parameter of a target object at a first calibration height;
        obtaining a second measured value corresponding to the measured parameter of the target object at a second calibration height;
        obtaining an actual value corresponding to the measured parameter of the target object;
        obtaining, based on the first measured value and the second measured value that are corresponding to the measured parameter, the first calibration height, and the second calibration height, a target calibration height that matches the actual value of the measured parameter; and
        obtaining a mapping relationship between a visual coordinate system corresponding to the target calibration height and a mechanical motion coordinate system.

11. The method according to claim 10, wherein determining the target assembly gap value based on the long-side length value and the short-side length value of the mobile phone screen and the long-side length value and the short-side length value of the mobile phone middle frame comprises:
    calculating a difference between the long-side length value of the mobile phone screen and the long-side length value of the mobile phone middle frame, to obtain a long-side difference;
    calculating a difference between the short-side length value of the mobile phone screen and the short-side length value of the mobile phone middle frame, to obtain a short-side difference; and
    calculating a quarter value of the long-side difference and the short-side difference, to obtain the target assembly gap value.

12. An automatic assembly device, wherein the automatic assembly device comprises a clamping mechanism, one or more cameras, one or more processors, and a memory, wherein the memory is configured to store program code;
    the clamping mechanism is configured to clamp a target object, and place the target object at a preset calibration height in response to a first motion control instruction, wherein the first motion control instruction is generated by the one or more processors;
    the one or more cameras are configured to obtain an image corresponding to the target object at a current calibration height in response to a current photographing instruction, wherein each current photographing instruction is generated by the one or more processors; and
    the one or more processors are configured to run the program code to perform the following steps:
        obtaining an image corresponding to the target object at a first calibration height, and obtaining a first measured value corresponding to a measured parameter;
        obtaining an image corresponding to the target object at a second calibration height, and obtaining a second measured value corresponding to the measured parameter;
        obtaining an actual value corresponding to the measured parameter of the target object;
        obtaining, based on the first measured value and the second measured value that are corresponding to the measured parameter, the first calibration height, and the second calibration height, a target calibration height that matches the actual value of the measured parameter; and
        obtaining a mapping relationship between a visual coordinate system corresponding to the target calibration height and a mechanical motion coordinate system.

13. The automatic assembly device according to claim 12, wherein when obtaining, based on the first measured value and the second measured value that are corresponding to the measured parameter, the first calibration height, and the second calibration height, the target calibration height that matches the actual value of the measured parameter, the one or more processors are specifically configured to:
    calculate a first measured difference between the first measured value and the second measured value of the measured parameter, and calculate a first height difference between the first calibration height and the second calibration height;
    calculate a ratio of the first measured difference to the first height difference; and obtain, through calculation based on algebraic expressions that have equal ratios and that are corresponding to first calibration height and the second calibration height, the target calibration height that matches the actual value of the measured parameter.

14. The automatic assembly device according to claim 12, wherein when obtaining, based on the first measured value and the second measured value that are corresponding to the measured parameter, the first calibration height, and the second calibration height, the target calibration height that matches the actual value of the measured parameter, the one or more processors are is specifically configured to:
   obtain the target calibration height through calculation according to the following formula:

$$z3 = \frac{(z2 - z1)(L3 - L1)}{L2 - L1} + z1,$$

wherein
   z3 is the target calibration height, z2 is the second calibration height, z1 is the first calibration height, L3 is the actual value of the measured parameter, L2 is the second measured value of the measured parameter, and L1 is the first measured value of the measured parameter.

15. The automatic assembly device according to claim 12, wherein obtaining the mapping relationship between the visual coordinate system corresponding to the target calibration height and the mechanical motion coordinate system comprises:
   obtaining a visual coordinate position corresponding to an identification point on a calibration board at the target calibration height;
   obtaining a mechanical coordinate position corresponding to the identification point; and
   determining, based on the visual coordinate position and the mechanical coordinate position that are corresponding to the identification point, the mapping relationship between the visual coordinate system corresponding to the target calibration height and the mechanical motion coordinate system.

16. The automatic assembly device according to claim 12, wherein obtaining the image corresponding to the target object at the first calibration height, and obtaining the first measured value corresponding to the measured parameter comprises:
   obtaining a visual measured value that is of the measured parameter in the visual coordinate system and that is corresponding to the target object at the first calibration height; and
   converting the visual measured value into a measured value corresponding to the mechanical motion coordinate system based on a first mapping relationship between a visual coordinate system corresponding to the first calibration height and the mechanical motion coordinate system, to obtain the first measured value.

17. The automatic assembly device according to claim 12, wherein the target object is a mobile phone curved screen, and the measured parameter comprises a short-side length and a long-side length of the mobile phone curved screen; or
   the target object is a mobile phone middle frame, and the measured parameter comprises an identification point relative distance on the mobile phone middle frame.

18. The automatic assembly device according to claim 12, wherein the clamping mechanism comprises an operation mechanism and a support platform;
   the operation mechanism is configured to separately place a mobile phone screen at a short-side target calibration height corresponding to a short-side length and a long-side target calibration height corresponding to a long-side length in response to a second motion control instruction;
   the one or more cameras are configured to separately obtain images corresponding to the mobile phone screen at the short-side target calibration height and the long-side target calibration height in response to a second photographing instruction;
   the support platform is configured to place a mobile phone middle frame at a middle-frame target calibration height in response to a third motion control instruction;
   the one or more cameras are configured to obtain an image corresponding to the mobile phone middle frame at the middle-frame target calibration height in response to a third photographing instruction; and
   the one or more processors are configured to run the program code stored in the memory, to further perform the following steps:
   obtaining a short-side length value of the mobile phone screen based on the image corresponding to the mobile phone screen at the short-side target calibration height and a coordinate system mapping relationship corresponding to the short-side target calibration height;
   obtaining a long-side length value of the mobile phone screen based on the image corresponding to the mobile phone screen at the long-side target calibration height and a coordinate system mapping relationship corresponding to the long-side target calibration height;
   obtaining a long-side length value and a short-side length value of the mobile phone middle frame based on the image corresponding to the mobile phone middle frame at the middle-frame target calibration height and a coordinate system mapping relationship corresponding to the middle-frame target calibration height;
   determining a target assembly gap value based on the long-side length value and the short-side length value of the mobile phone screen and the long-side length value and the short-side length value of the mobile phone middle frame; and
   controlling the operation mechanism to adjust a position of the mobile phone screen, so that an actual gap value of the mobile phone screen and the mobile phone middle frame matches the target assembly gap value.

19. The automatic assembly device according to claim 18, wherein determining the target assembly gap value based on the long-side length value and the short-side length value of the mobile phone screen and the long-side length value and the short-side length value of the mobile phone middle frame comprises:
   calculating a difference between the long-side length value of the mobile phone screen and the long-side length value of the mobile phone middle frame, to obtain a long-side difference;
   calculating a difference between the short-side length value of the mobile phone screen and the short-side length value of the mobile phone middle frame, to obtain a short-side difference; and
   calculating a quarter value of the long-side difference and the short-side difference, to obtain the target assembly gap value.

20. The automatic assembly device according to claim 18, wherein the operation mechanism comprises a manipulator.

* * * * *